United States Patent
Agiwal et al.

(10) Patent No.: US 11,979,756 B2
(45) Date of Patent: May 7, 2024

(54) METHOD AND APPARATUS FOR HANDLING BEAM FAILURE RECOVERY IN A WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 17/444,450

(22) Filed: Aug. 4, 2021

(65) Prior Publication Data

US 2022/0046441 A1 Feb. 10, 2022

(30) Foreign Application Priority Data

Aug. 5, 2020 (KR) .................. 10-2020-0098181

(51) Int. Cl.
*H04W 24/04* (2009.01)
*H04L 5/00* (2006.01)

(52) U.S. Cl.
CPC ........... *H04W 24/04* (2013.01); *H04L 5/0048* (2013.01)

(58) Field of Classification Search
CPC . H04W 24/04; H04W 16/28; H04W 36/0072; H04W 72/1263; H04W 56/001; H04W 80/02; H04W 52/028; H04W 76/19; H04L 5/0048; H04B 7/0695; H04B 7/088
See application file for complete search history.

(56) References Cited

U.S. PATENT DOCUMENTS

| | | | |
|---|---|---|---|
| 11,621,762 B2* | 4/2023 | Cirik | H04W 76/19 370/329 |
| 2019/0174385 A1* | 6/2019 | Sang | H04W 76/27 |
| 2020/0052769 A1* | 2/2020 | Cirik | H04L 1/0026 |
| 2020/0267797 A1* | 8/2020 | Wei | H04W 72/23 |

(Continued)

FOREIGN PATENT DOCUMENTS

| | | | | |
|---|---|---|---|---|
| CN | 115699602 A | * | 2/2023 | H04L 5/0053 |
| WO | WO-2021237455 A1 | * | 12/2021 | H04L 5/0053 |

OTHER PUBLICATIONS

International Search Report and Written Opinion of the International Searching Authority in connection with International Application No. PCT/KR2021/010364 dated Nov. 12, 2021, 10 pages.

(Continued)

*Primary Examiner* — Ayaz R Sheikh
*Assistant Examiner* — Louis Samara

(57) ABSTRACT

A method performed by a user equipment (UE) in a wireless communication system is provided. The method comprising: triggering, by medium access control (MAC) layer, a beam failure recovery for at least one serving cell, identifying, by MAC layer, whether evaluation of candidate beams is completed for the at least one serving cell for which the failure recovery is triggered and not cancelled, and generating, by MAC layer, a MAC control element (CE) for beam failure recovery based on a identified result, wherein detection information in the MAC CE is set to 1 for the at least one serving cell for which a beam failure is detected and evaluation of candidate beams is completed.

18 Claims, 21 Drawing Sheets

(56) References Cited

U.S. PATENT DOCUMENTS

| | | | |
|---|---|---|---|
| 2021/0013948 A1 | 1/2021 | Agiwal et al. | |
| 2021/0021320 A1* | 1/2021 | Koskela | H04W 56/001 |
| 2021/0028849 A1* | 1/2021 | Chin | H04B 7/06964 |
| 2021/0029745 A1* | 1/2021 | Zhang | H04W 80/02 |
| 2021/0044342 A1* | 2/2021 | He | H04B 7/0695 |
| 2022/0209840 A1* | 6/2022 | You | H04W 76/19 |
| 2023/0104029 A1* | 4/2023 | Matsumura | H04L 5/005 |
| | | | 370/329 |
| 2023/0262816 A1* | 8/2023 | Yi | H04B 7/088 |
| | | | 370/329 |

OTHER PUBLICATIONS

Nokia et al., "BFR on dormant SCell", R2-2000679, 3GPP TSG-RAN WG2 Meeting #109e, Elbonia, Feb. 24-Mar. 6, 2020, 3 pages.

Samsung, "On Rel. 17 FeMIMO WI", R1-2003918, 3GPP TSG RAN WG1 #101, e-Meeting, May 25-Jun. 5, 2020, 12 pages.

Qualcomm Incorporated et al., "Discussion on the necessity of supporting implicit BFD-RS in dormant BWP", R2-2005715, 3GPP TSG-RAN WG2 Meeting #110-e, E-Conference, Jun. 1-12, 2020, 5 pages.

ZTE, "Enhancements on multi-beam operation", R1-1908192, 3GPP TSG RAN WG1 Meeting #98, Prague, CZ, Aug. 26-30, 2019, 26 pages.

Supplementary European Search Report dated Sep. 29, 2023, in connection with European Patent Application No. 21852600.2, 11 pages.

Sharp et al., "Discussion on pending BF SR upon Scell deactivation," 3GPP TSG-RAN WG2 Meeting #109bis, Electronic, Apr. 2020, R2-2002605, 3 pages.

Supplementary European Search Report dated Jan. 8, 2024, in connection with European Patent Application No. 21852600.2, 9 pages.

\* cited by examiner

METHOD AND APPARATUS FOR HANDLING BEAM FAILURE RECOVERY IN A WIRELESS COMMUNICATION SYSTEM

CROSS-REFERENCE TO RELATED APPLICATIONS

This application is based on and claims priority under 35 U.S.C. § 119(e) to Korean Provisional Patent Application No. 10-2020-0098181 filed on Aug. 5, 2020, in the Korea Patent and Trademark Office, the disclosure of which is incorporated by reference herein in its entirety.

BACKGROUND

1. Field

The present application relates generally to wireless communication systems, more specifically, the present disclosure relates to handling beam failure recovery in serving cell supporting multiple TRPs.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The present disclosure relates handling beam failure recovery in serving cell supporting multiple TRPs.

In one embodiment, a method performed by a user equipment (UE) in a wireless communication system is provided. The method includes triggering, by medium access control (MAC) layer, a beam failure recovery for at least one serving cell, identifying, by MAC layer, whether evaluation of candidate beams is completed for the at least one serving cell for which the failure recovery is triggered and not cancelled, and generating, by MAC layer, a MAC control element (CE) for beam failure recovery based on a identified result, wherein detection information in the MAC CE is set to 1 for the at least one serving cell for which a beam failure is detected and evaluation of candidate beams is completed.

In another embodiment, a user equipment (UE) in a wireless communication system is provided. The UE includes a transceiver, and at least one processor coupled with the transceiver and configured to: trigger, by medium access control (MAC) layer, a beam failure recovery for the at least one serving cell, identify, by MAC layer, whether evaluation of candidate beams is completed for the at least one serving cell for which the failure recovery is triggered and not cancelled, and generate, by MAC layer, a MAC control element (CE) for beam failure recovery based on a identified result, wherein detection information in the MAC CE is set to 1 for the at least one serving cell for which a beam failure is detected and evaluation of candidate beams is completed.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
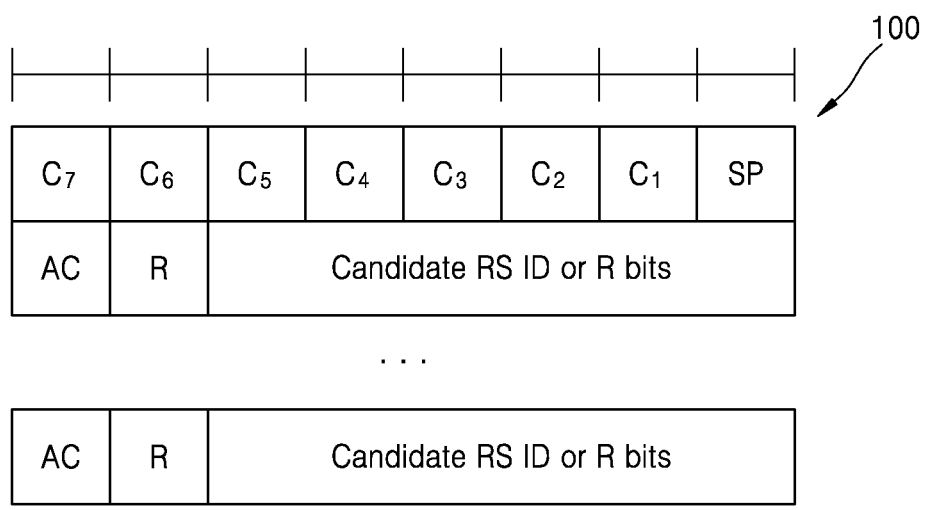
FIG. 1 illustrates an example of BFR MAC CE according to embodiments of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3 GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS)

described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, the fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. A few examples use cases the fifth generation wireless communication system is expected to address are enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the fifth generation wireless communication system operating in higher frequency (mmWave) bands, a UE and a gNB communicate with each other using beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using the beamforming technique, a transmitter can make a plurality of transmit beam patterns of different directions. Each of these transmit beam patterns can be also referred as transmit (TX) beam. Wireless communication system operating at high frequency uses a plurality of narrow TX beams to transmit signals in the cell as each narrow TX beam provides coverage to a part of cell. The narrower the TX beam, the higher is the antenna gain and hence the larger the propagation distance of signal transmitted using beamforming. A receiver can also make a plurality of receive (RX) beam patterns of different directions. Each of these receive patterns can be also referred as receive (RX) beam.

The fifth generation wireless communication system supports standalone mode of operation as well dual connectivity (DC). In DC a multiple Rx/Tx UE may be configured to utilise resources provided by two different nodes (or NBs) connected via non-ideal backhaul. One node acts as the master node (MN) and the other acts as the Secondary Node (SN). The MN and SN are connected via a network interface and at least the MN is connected to the core network. NR also supports multi-RAT dual connectivity (MR-DC) operation whereby a UE in RRC_CONNECTED is configured to utilise radio resources provided by two distinct schedulers, located in two different nodes connected via a non-ideal backhaul and providing either E-UTRA (i.e., if the node is an ng-eNB) or NR access (i.e., if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the special Cell(s) and all secondary cells. In NR the term master cell group (MCG) refers to a group of serving cells associated with the Master Node, comprising of the PCell and optionally one or more SCells. In NR the term secondary cell group (SCG) refers to a group of serving cells associated with the secondary node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, SCell is a cell providing additional radio resources on top of special cell. Primary SCG Cell (PSCell) refers to a serving cell in SCG in which the UE performs random access when performing the reconfiguration with sync procedure. For dual connectivity operation the term SpCell (i.e., Special Cell) refers to the PCell of the MCG or the PSCell of the SCG, otherwise the term special cell refers to the PCell.

In the fifth generation wireless communication system, physical downlink control channel (PDCCH) is used to schedule DL transmissions on PDSCH and UL transmissions on PUSCH, where the downlink control information (DCI) on PDCCH includes: downlink assignments containing at least modulation and coding format, resource allocation, and hybrid-ARQ information related to downlink shared channel (DL-SCH); Uplink scheduling grants containing at least modulation and coding format, resource allocation, and hybrid-ARQ information related to UL-SCH. In addition to scheduling, PDCCH can be used to for: activation and deactivation of configured PUSCH transmission with configured grant; activation and deactivation of PDSCH semi-persistent transmission; notifying one or more UEs of the slot format; notifying one or more UEs of the PRB(s) and OFDM symbol(s) where the UE may assume no transmission is intended for the UE; transmission of TPC commands for PUCCH and PUSCH; transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE comprising a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In the fifth generation wireless communication system, a list of search space configurations is signalled by a gNB for each configured BWP wherein each search configuration is uniquely identified by an identifier. Identifier of search space configuration to be used for specific purpose such as paging reception, SI reception, random access response reception is explicitly signalled by gNB. In NR, search space configuration comprises of parameters monitoring-periodicity-PDCCH-slot, monitoring-offset-PDCCH-slot, monitoring-symbols-PDCCH-within-slot and duration. A UE determines PDCCH monitoring occasion(s) within a slot using the parameters PDCCH monitoring periodicity (monitoring-periodicity-PDCCH-slot), the PDCCH monitoring offset (monitoring-offset-PDCCH-slot), and the PDCCH monitoring pattern (monitoring-symbols-PDCCH-within-slot). PDCCH monitoring occasions are there in slots "x" to x+duration where the slot with number "x" in a radio frame with number "y" satisfies the equation 1 below:

$$(y*(\text{number of slots in a radio frame})+x-\text{monitoring-offset-PDCCH-slot})\bmod (\text{monitoring-periodicity-PDCCH-slot})=0; \quad [\text{Equation 1}]$$

The starting symbol of a PDCCH monitoring occasion in each slot having PDCCH monitoring occasion is given by monitoring-symbols-PDCCH-within-slot. The length (in symbols) of a PDCCH monitoring occasion is given in the coreset associated with the search space. The search space configuration includes the identifier of coreset configuration associated with it. A list of coreset configurations is signalled by a gNB for each configured BWP wherein each coreset configuration is uniquely identified by an identifier. For example, each radio frame is of 10 ms duration. The radio frame is identified by a radio frame number or system frame number. Each radio frame comprises several slots wherein the number of slots in the radio frame and duration of slots depends on sub carrier spacing. The number of slots in a radio frame and duration of slots depends on the radio frame for each supported SCS is pre-defined in NR. Each coreset configuration is associated with a list of transmission configuration indicator (TCI) states. One DL RS ID (SSB or CSI RS) is configured per TCI state. The list of TCI states corresponding to a coreset configuration is signalled by a gNB via RRC signalling. One of the TCI state in TCI state list is activated and indicated to a UE by a gNB. TCI state indicates the DL TX beam (DL TX beam is QCLed with SSB/CSI RS of TCI state) used by a gNB for transmission of PDCCH in the PDCCH monitoring occasions of a search space.

In the fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a bandwidth part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, the UE is configured with one or more DL and UL BWPs, for each configured Serving Cell (i.e., PCell or SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-Inactivity Timer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by a non-synchronized UE in RRC CONNECTED state. Several types of random access procedure is supported.

Contention based random access (CBRA): This is also referred as 4 step CBRA. In this type of random access, a UE first transmits random access preamble (also referred as Msg1) and then waits for random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80* 8*ul_carrier_id, where s_id is the index of the first orthogonal frequency division multiplexing (OFDM) symbol of the PRACH occasion where the UE has transmitted Msg1, i.e., RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various random access preambles detected by a gNB can be multiplexed in the same RAR media access control (MAC) protocol data unit (PDU) by the gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable (configured by a gNB in RACH configuration) number of times, the UE goes back to first step i.e., select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. A Msg3 includes message such as an RRC connection request, an RRC connection re-establishment request, an RRC handover confirm, scheduling request, an SI request etc. It may include the UE identity (i.e., cell-radio network temporary identifier (C-RNTI) or system architecture evolution (SAE)-temporary mobile subscriber identity (S-TMSI) or a random number). After transmitting the Msg3, a UE starts a contention resolution timer. While the contention resolution timer is running, if the UE receives a physical downlink control channel (PDCCH) addressed to C-RNTI included in Msg3, contention resolution is considered successful, contention resolution timer is stopped and RA procedure is completed. While the contention resolution timer is running, if a UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to first step i.e., select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to a UE dedicated Random access preamble. A UE transmits the dedicated RA preamble. An ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by a gNB in RACH configuration) number of times, the UE retransmits the RA preamble.

For certain events such has handover and beam failure recovery if dedicated preamble(s) are assigned to a UE, during first step of random access i.e., during random access resource selection for Msg1 transmission, the UE determines whether to transmit dedicated preamble or non-dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e., dedicated preambles/ROs) are provided by a gNB, the UE selects non dedicated preamble. Otherwise, the UE selects dedicated preamble. So, during the RA procedure, one random access attempt can be CFRA while other random access attempt can be CBRA.

2 step contention based random access (2 step CBRA): In the first step, a UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e., gNB) within a configured window. The response is also referred as MsgB. If CCCH SDU was transmitted in MsgA payload, the UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if the UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, the UE transmits Msg3 and performs contention resolution using Msg4 as in CBRA procedure. If contention resolution is successful, random access procedure is considered successfully completed. If contention resolution fails upon fallback (i.e., upon transmitting Msg3), the UE retransmits MsgA. If configured window in which the UE monitors network response after transmitting MsgA expires and the UE has not received MsgB including contention resolution information or fallback information as explained above, the UE retransmits MsgA. If the random access procedure is not successfully completed even after transmitting the msgA configurable number of times, the UE fallbacks to 4 step RACH procedure i.e., UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is the random ID. When the UE performs RA in IDLE state after it is attached to the network, the UE ID is S-TMSI. If the UE has an assigned C-RNTI (e.g., in connected state), the UE ID is C-RNTI. In case the UE is in INACTIVE state, the UE ID is resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case, a gNB assigns to a UE dedicated random access preamble (s) and PUSCH resource(s) for MsgA transmission. RO(s) to be used for preamble transmission may also be indicated. In the first step, the UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. If the UE receives PDCCH addressed to C-RNTI, random access procedure is considered successfully completed. If the UE receives fallback information corresponding to its transmitted preamble, random access procedure is considered successfully completed.

For certain events such has handover and beam failure recovery if dedicated preamble(s) and PUSCH resource(s) are assigned to a UE, during first step of random access i.e., during random access resource selection for MsgA transmission, the UE determines whether to transmit dedicated preamble or non-dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by gNB, the UE selects non dedicated preamble. Otherwise, the UE selects dedicated preamble. So, during the RA procedure, one random access attempt can be 2 step CFRA while other random access attempt can be 2 step CBRA.

Upon initiation of random access procedure, a UE first selects the carrier (SUL or NUL). If the carrier to use for the random access procedure is explicitly signalled by gNB, the UE selects the signalled carrier for performing random access procedure. If the carrier to use for the random Access procedure is not explicitly signalled by a gNB; and if the serving cell for the random access procedure is configured with supplementary uplink and if the RSRP of the downlink pathloss reference is less than rsrp-ThresholdSSB-SUL: the UE selects the SUL carrier for performing random access procedure. Otherwise, the UE selects the NUL carrier for performing random access procedure. Upon selecting the UL carrier, the UE determines the UL and DL BWP for random access procedure as specified in 3GPP standard specification. The UE then determines whether to perform 2 step or 4 step RACH for this random access procedure.

If this random access procedure is initiated by PDCCH order and if the ra-PreambleIndex explicitly provided by PDCCH is not 0b000000, a UE selects 4 step RACH.

else if 2 step contention free random access resources are signaled by a gNB for this random access procedure, the UE selects 2 step RACH.

else if 4 step contention free random access resources are signaled by the gNB for this random access procedure, the UE selects 4 step RACH.

else if the UL BWP selected for this random access procedure is configured with only 2 step RACH resources, the UE selects 2 step RACH.

else if the UL BWP selected for this random access procedure is configured with only 4 step RACH resources, the UE selects 4 step RACH.

else if the UL BWP selected for this random access procedure is configured with both 2 step and 4 step RACH resources, if RSRP of the downlink pathloss reference is below a configured threshold, the UE selects 4 step RACH. Otherwise, the UE selects 2 step RACH.

In the fifth generation wireless communication system, node B (gNB) or base station in cell broadcast synchronization signal and PBCH block (SSB) consists of primary synchronization signals (PSS) and secondary synchronization signals (SSS) and system information. System information includes common parameters needed to communicate in cell.

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e., no RRC connection is established, the UE is in RRC_IDLE state. The RRC states can further be characterized as follows:

In the RRC_IDLE, a UE specific DRX may be configured by upper layers. The UE monitors short messages transmitted with P-RNTI over DCI; monitors a paging channel for CN paging using 5G-S-TMSI; performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; the UE stores the UE inactive AS context; a RAN-based notification area is configured by RRC layer. The UE monitors short messages transmitted with P-RNTI over DCI; The UE monitors a paging channel for CN paging using 5G-S-TMSI and RAN paging using full I-RNTI; The UE performs neighboring cell measurements and cell (re-)selection; The UE performs RAN-based notification area updates periodically and when moving outside the configured RAN-based notification area; The UE acquires system information and can send SI request (if configured); The UE performs logging of available measurements together with location and time for logged measurement configured UEs.

In the RRC_CONNECTED, the UE stores the AS context and transfer of unicast data to/from UE takes place. The UE monitors short messages transmitted with P-RNTI over DCI, if configured; monitors control channels associated with the shared data channel to determine if data is scheduled for the UE; provides channel quality and feedback information; The UE performs neighboring cell measurements and measurement reporting; acquires system information.

In the RRC_CONNECTED, a network may initiate suspension of the RRC connection by sending RRC release with suspend configuration. When the RRC connection is suspended, the UE stores the UE inactive AS context and any configuration received from the network, and transits to RRC_INACTIVE state. If the UE is configured with SCG, the UE releases the SCG configuration upon initiating a RRC Connection resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform an RNA update or by RAN paging from NG-RAN. When the RRC connection is resumed, a network configures the UE according to the RRC connection resume procedure based on the stored UE inactive AS context and any RRC configuration received from the network. The RRC connection resume procedure re-activates AS security and re-establishes SRB(s) and DRB(s). In response to a request to resume the RRC connection, the network may resume the suspended RRC connection and send the UE to RRC_CONNECTED, or reject the request to resume and send the UE to RRC_INACTIVE (with a wait timer), or directly re-suspend the RRC connection and send the UE to RRC_INACTIVE, or directly release the RRC connection and send the UE to RRC_IDLE, or instruct the UE to initiate NAS level recovery (in this case the network sends an RRC setup message).

Upon initiating the resume procedure, UE: applies the default L1 parameter values as specified in corresponding physical layer specifications, except for the parameters for which values are provided in SIB1; applies the default MAC Cell Group configuration; applies the CCCH configuration; start timer T319; applies the timeAlignmentTimerCommon included in SIB1; applies the default SRB1 configuration; sets the variable pendingRNA-Update to false; initiates transmission of the RRCResumeRequest message or RRCResumeRequest1; restores the RRC configuration, RoHC state, the stored QoS flow to DRB mapping rules and the KgNB and KRRCint keys from the stored UE inactive AS context except for the following: masterCellGroup, mrdc-SecondaryCellGroup, if stored; and pdcp-Config; sets the resumeMAC-I to the 16 least significant bits of the MAC-I calculated: with the $K_{RRCint}$ key in the UE inactive AS Context and the previously configured integrity protection algorithm; and with all input bits for COUNT, BEARER and DIRECTION set to binary ones; derives the $K_{gNB}$ key based on the current $K_{gNB}$ key or the NH, using the stored nextHopChainingCount value; derives the $K_{RRCenc}$ key, the $K_{RRCint}$ key, the $K_{UPint}$ key and the $K_{UPenc}$ key; configures lower layers to apply integrity protection for all signaling radio bearers except SRB0 using the configured algorithm and the $K_{RRCint}$ key and $K_{UPint}$ key, i.e., integrity protection may be applied to all subsequent messages received and sent by the UE; configures lower layers to apply ciphering for all signaling radio bearers except SRB0 and to apply the configured ciphering algorithm, the $K_{RRCenc}$ key and the $K_{UPenc}$ key derived in this subclause, i.e., the ciphering configuration may be applied to all subsequent messages received and sent by the UE; re-establishes PDCP entities for SRB1; resumes SRB1; and transmits RRCResumeRequest or RRCResumeRequest1.

Figure 2:
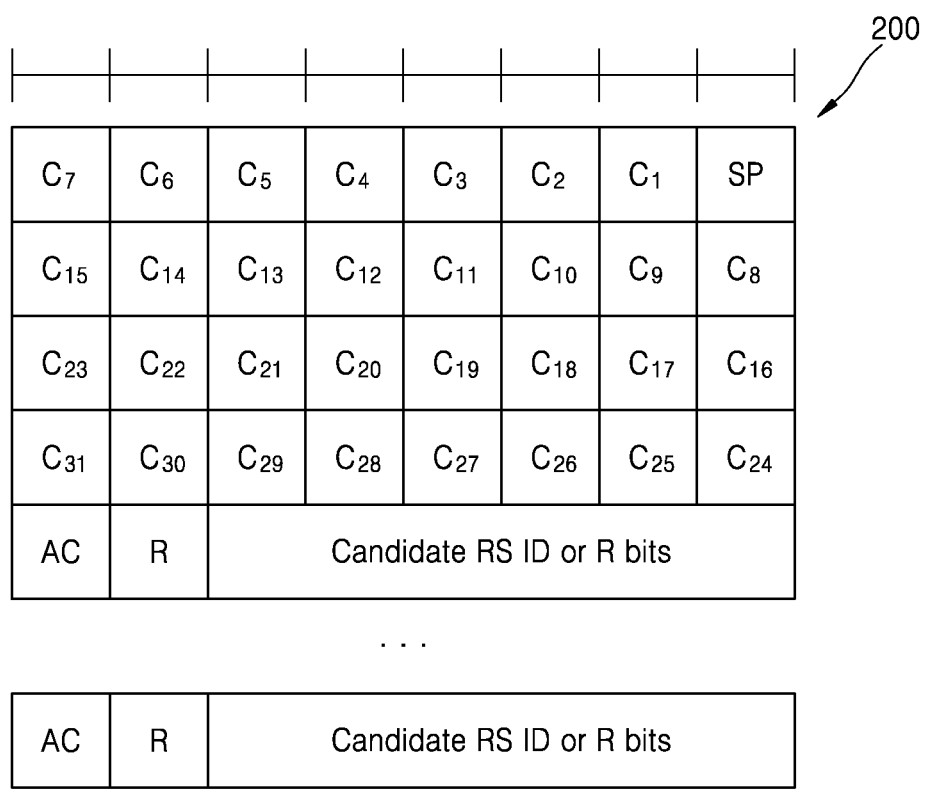
FIG. 2 illustrates an example of BFR MAC CE according to embodiments of the present disclosure.

FIG. 1 and FIG. 2 illustrate an example of BFR MAC CE according to embodiments of the present disclosure. FIG. 1 illustrates an example of SCell beam failure recovery (BFR) MAC CE and truncated SCell BFR MAC CE with the highest ServCellIndex of this MAC entity's SCell configured with Beam Failure detection (BFD) is less than 8. Also, FIG. 2 illustrates an example of SCell BFR MAC CE and truncated SCell BFR MAC CE with the highest ServCellIndex of this MAC entity's SCell configured with BFD is equal to or higher than 8.

The fifth generation wireless communication system supports beam failure detection and recovery mechanism at a UE for serving cell. This comprises of beam failure detection, new candidate beam identification, beam failure recovery request transmission and monitoring response for beam failure recovery request. For beam failure detection of a serving cell, the UE is configured with a list of beam failure detection RSs (SSB or CSI-RS based) for that serving cell. The UE may monitor these RSs periodically. A beam failure is detected on a serving cell if number of consecutive detected beam failure instance exceeds a configured maximum number (beamFailureInstanceMaxCount) within a configured time (beamFailureDetectionTimer). A beam failure instance means that hypothetical PDCCH BLER determined based on measurement of beam failure detection RS is above a threshold for all beam failure detection RSs. Beam failure detection may be configured for zero or one or more serving cells. Upon beam failure instance, lower layer i.e., PHY layer sends indication to MAC layer (i.e., MAC entity). The MAC entity in a UE for each serving cell configured for beam failure detection, may perform the following operation:

1> if beam failure instance indication has been received from lower layers:
2> start or restart the beamFailureDetectionTimer;
2> increment BFI_COUNTER by 1;

2> if BFI_COUNTER>=beamFailureInstanceMaxCount:
   3> if the serving cell is SCell:
      4> trigger a beam failure recovery (BFR) for this serving cell;
   3> else:
      4> initiate a random access procedure on the SpCell.
1> if the beamFailureDetectionTimer expires; or
1> if beamFailureDetectionTimer, beamFailureInstanceMaxCount, or any of the reference signals used for beam failure detection is reconfigured by upper layers (i.e., RRC) associated with this Serving Cell:
   2> set BFI_COUNTER to 0.
1> if the Serving Cell is SpCell and the random access procedure initiated for SpCell beam failure recovery is successfully completed:
   2> set BFI_COUNTER to 0;
   2> stop the beamFailureRecoveryTimer, if configured;
   2> consider the beam failure recovery procedure successfully completed.
1> else if the serving cell is SCell, and a PDCCH addressed to C-RNTI indicating uplink grant for a new transmission is received for the HARQ process used for the transmission of the BFR MAC CE 100 or truncated BFR MAC CE 100 which contains beam failure recovery information of this serving cell; or
1> if the SCell is deactivated:
   2> set BFI_COUNTER to 0;
   2> consider the beam failure recovery procedure successfully completed and cancel all the triggered BFRs for this serving cell.

The MAC entity may:
1> if the beam failure recovery procedure determines that at least one BFR has been triggered and not cancelled:
   2> if UL-SCH resources are available for a new transmission and if the UL-SCH resources can accommodate the BFR MAC CE 100 plus its subheader as a result of logical channel prioritization (LCP):
      3> instruct the multiplexing and assembly procedure to generate the BFR MAC CE 100.
   2> else if UL-SCH resources are available for a new transmission and if the UL-SCH resources can accommodate the truncated BFR MAC CE 100 plus its subheader as a result of LCP:
      3> instruct the multiplexing and assembly procedure to generate the truncated BFR MAC CE 100.
   2> else:
      3> trigger the SR for SCell beam failure recovery for each SCell for which BFR has been triggered and not cancelled.

All BFRs triggered prior to MAC PDU assembly for beam failure recovery for an SCell may be cancelled when a MAC PDU is transmitted and this PDU includes a BFR MAC CE 100 or truncated BFR MAC CE 100 which contains beam failure information of that SCell.

beamFailureInstanceMaxCount, beamFailureDetectionTimer, and beamFailureRecoveryTimer for the beam failure recovery procedure are specific to serving cell. BFI_COUNTER is maintained separately for each serving cell configured with beam failure detection.

The MAC CEs for BFR includes either:
BFR MAC CE 100; or
Truncated BFR MAC CE 100.

The BFR MAC CE 100 and truncated BFR MAC CE 100 are identified by a MAC subheader with LCID/eLCID.

The BFR MAC CE and truncated BFR MAC CE have a variable size. The BFR MAC CE and truncated BFR MAC CE include a bitmap and in ascending order based on the ServCellIndex, beam failure recovery information i.e., i.e., octets containing candidate beam availability indication (AC) for SCells indicated in the bitmap. For BFR MAC CE 100, a single octet bitmap is used when the highest ServCellIndex of this MAC entity's SCell for which beam failure is detected is less than 8 (shown in FIG. 1), otherwise four octets are used (shown in FIG. 2). A MAC PDU may contain at most one BFR MAC CE.

For truncated BFR MAC CE, a single octet bitmap is used for the following cases, otherwise four octets are used:
   the highest ServCellIndex of this MAC entity's SCell for which beam failure is detected is less than 8; or
   beam failure is detected for SpCell and the SpCell is to be indicated in a truncated BFR MAC CE and the UL-SCH resources available for transmission cannot accommodate the truncated BFR MAC CE with the four octets bitmap plus its subheader as a result of LCP.

The fields in the BFR MAC CEs 100, 200 are defined as follows:
SP: This field indicates beam failure detection for the SpCell of this MAC entity. The SP field is set to 1 to indicate that beam failure is detected for SpCell only when BFR MAC CE or truncated BFR MAC CE is to be included into a MAC PDU as part of random access procedure, otherwise, it is set to 0;

$C_i$ (BFR MAC CE): This field indicates beam failure detection and the presence of an octet containing the AC field for the SCell with ServCellIndex i. The $C_i$ field set to 1 indicates that beam failure is detected and the octet containing the AC field is present for the SCell with ServCellIndex i. The $C_i$ field set to 0 indicates that the beam failure is not detected and octet containing the AC field is not present for the SCell with ServCellIndex i. The octets containing the AC field are present in ascending order based on the ServCellIndex;

$C_i$ (truncated BFR MAC CE): This field indicates beam failure detection for the SCell with ServCellIndex i. The $C_i$ field set to 1 indicates that beam failure is detected and the octet containing the AC field for the SCell with ServCellIndex i may be present. The $C_i$ field set to 0 indicates that the beam failure is not detected and the octet containing the AC field is not present for the SCell with ServCellIndex i. The octets containing the AC field, if present, are included in ascending order based on the ServCellIndex. The number of octets containing the AC field included is maximised, while not exceeding the available grant size;

AC: this field indicates the presence of the candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;

Candidate RS ID: this field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.

R: reserved bit, set to 0.

Figure 3:
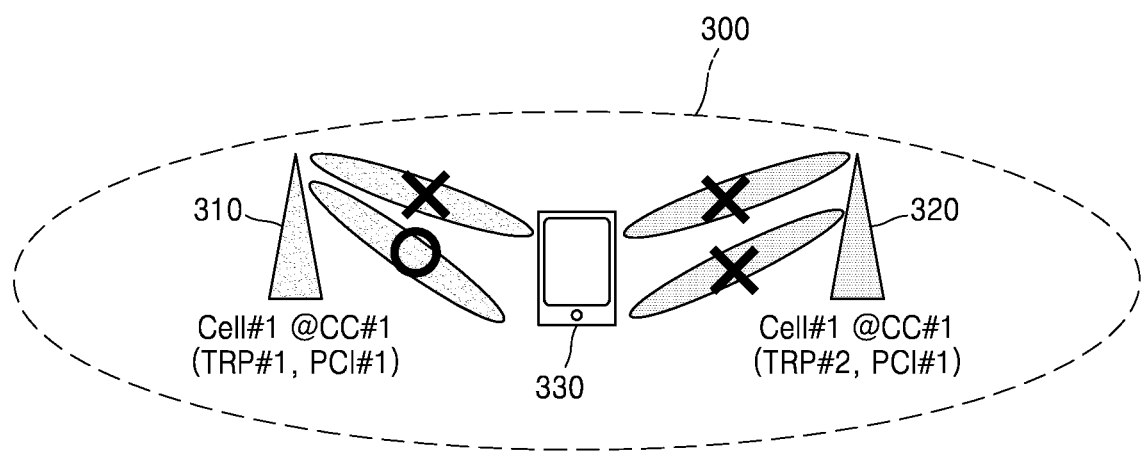
FIG. 3 illustrates an example wireless network according to embodiments of the present disclosure.

FIG. 3 illustrates an example wireless network according to embodiments of the present disclosure.

A serving cell can support multiple transmission/reception points (TRPs) 310, 320 and a UE 330 can be served with multiple TRPs 310, 320 concurrently for improved data rate and reliability. In the current design, beam failure detection and recovery are per serving cell. For example, list of BFD RSs is signaled per serving cell and Candidate beam RS list is signaled per serving cell. As shown in FIG. 3, if all beams of a TRP 320 of serving cell fails, beam failure is not detected and hence the TRP 320 cannot serve the UE 330 until all beams of all TRPs of serving cell fail and beam failure recovery is initiated for the serving cell. Beam failure detection and recovery procedure needs to be enhanced.

Beam failure detection configuration.

In one method of this disclosure, for beam failure detection in a serving cell, a gNB signal/transmit (in RRCReconfiguration message) the beam failure detection configuration including the list of beam failure detection RSs wherein in the list, the TRP associated with each RS may be indicated. This beam failure detection configuration is per BWP (or DL BWP). A parameter "trpIndex" may indicate the TRP associated with each RS. Below is an example for the case where there are up to two TRPs in a serving cell. It is to be noted that parameter "trpIndex" may not be included if there is only one TRP in a serving cell. In an embodiment for the case where there are two TRPs (TRP 0 and TRP 1) in a serving cell, "trpIndex" may be included for RS associated with TRP 1 and "trpIndex" may not be included for RS associated with TRP 0. Absence of "trpIndex" may implicit mean that RS is associated with TRP 0. In an embodiment for the case where there are two TRPs ($1^{st}$ TRP 0 and $2^{nd}$ TRP) in a serving cell, "trpIndex" may be included for RS associated with second TRP and "trpIndex" may not be included for RS associated with first TRP 0. Absence of "trpIndex" may implicit mean that RS is associated with first TRP.

TABLE 1

```
RadioLinkMonitoringConfig: =      SEQUENCE {
   failureDetectionResourcesToAddModList   SEQUENCE   (SIZE
(1..maxNrofFailureDetectionResources)) OF RadioLinkMonitoringRS
OPTIONAL, -- Need N
   failureDetectionResourcesToReleaseList     SEQUENCE     (SIZE
(1..maxNrofFailureDetectionResources)) OF RadioLinkMonitoringRS-Id
OPTIONAL, -- Need N
   beamFailureInstanceMaxCount       ENUMERATED {n1, n2, n3, n4,
n5, n6, n8, n10}                      OPTIONAL, --Need R
   beamFailureDetectionTimer         ENUMERATED {pbfd1, pbfd2,
pbfd3, pbfd4, pbfd5, pbfd6, pbfd8, pbfd10} OPTIONAL, -- Need R
   ...
}
RadioLinkMonitoringRS: =             SEQUENCE {
   radioLinkMonitoringRS-Id              RadioLinkMonitoringRS-Id,
   purpose                               ENUMERATED
{beamFailure, rlf, both},
   detectionResource                     CHOICE {
      ssb-Index                             SSB-Index,
      csi-RS-Index                          NZP-CSI-RS-ResourceId
   },
   ...,
   [[
      trpIndex-r17                          INTEGER (0..1)
OPTIONAL, -- Need S
   ]]
}
```

In an embodiment, radioLinkMonitoringRSPoolIndex (can also be referred as RS pool index/identifier or RS set index/identifier) can be added instead of trpIndex. Based on this UE can identify multiple sets/pools of beam failure detection RSs wherein RSs in same set/pool may correspond to same radioLinkMonitoringRSPoolIndex/RS set index/RS pool index. The set of RSs corresponding to a TRP have same radioLinkMonitoringRSPoolIndex/RS set index/RS pool index.

In another method of this disclosure, for beam failure detection in a serving cell, a gNB may signal/transmit the beam failure detection configuration wherein list of BFD RSs is signaled separately for each TRP per BWP (or DL BWP) of serving cell. Below is an example for the case where there are up to two TRPs in a serving cell. failureDetectionResourcesToAddModList and failureDetectionResourcesToAddModList2 may indicate list of BFD RSs for different TRPs.

TABLE 2

```
RadioLinkMonitoringConfig::=         SEQUENCE {
   failureDetectionResourcesToAddModList           SEQUENCE
(SIZE(1..maxNrofFailureDetectionResources)) OF RadioLinkMonitoringRS
OPTIONAL, -- Need N
   failureDetectionResourcesToReleaseList           SEQUENCE
(SIZE(1..maxNrofFailureDetectionResources)) OF RadioLinkMonitoringRS-Id
OPTIONAL, -- Need N
   beamFailureInstanceMaxCount           ENUMERATED {n1, n2, n3,
n4, n5, n6, n8, n10}               OPTIONAL, -- Need R
   beamFailureDetectionTimer           ENUMERATED {pbfd1, pbfd2, pbfd3,
pbfd4, pbfd5, pbfd6, pbfd8, pbfd10}OPTIONAL, -- Need R
   ...,
   [[
      failureDetectionResourcesToAddModList2           SEQUENCE
(SIZE(1..maxNrofFailureDetectionResources)) OF RadioLinkMonitoringRS
OPTIONAL,  --  Need  N   failureDetectionResourcesToReleaseList2 SEQUENCE
(SIZE(1..maxNrofFailureDetectionResources)) OF RadioLinkMonitoringRS-Id
   ]]
}
RadioLinkMonitoringRS ::=             SEQUENCE {
   radioLinkMonitoringRS-Id              RadioLinkMonitoringRS-Id,
   purpose                               ENUMERATED
{beamFailure, rlf, both},
   detectionResource                     CHOICE {
      ssb -Index                            SSB-Index,
      csi-RS-Index                          NZP-CSI-RS-ResourceId
   },
   ...,
}
```

In an alternate embodiment, a gNB can signal RadioLinkMonitoringConfig 1E separately for different TRP of a serving cell. For example, if there are two TRPs, RadioLinkMonitoringConfig and radioLinkMonitoringConfig1 can be signaled (in RRCReconfiguration message) for first TRP and second TRP respectively in BWP-DownlinkDedicated IE of serving cell.

Using one of the signal methods explained above, a gNB can signal (in RRCReconfiguration message) beam failure detection configuration for a serving cell where configuration indicates multiple sets/pools of beam failure detection RSs, wherein each set/pool belongs to different TRP. Upon receiving the beam failure detection configuration from the gNB for a serving cell according to one of the signaling methods explained above, a UE can identify multiple sets/pools of beam failure detection RSs wherein each set/pool belongs to different TRPs.

Beam failure recovery configuration.

In one method of this disclosure, for beam failure recovery, a gNB may signal/transmit (in RRCReconfiguration message) the beam failure recovery configuration including the list of candidate beam RSs wherein in the list, the TRP associated with each RS may be indicated. This configuration is per BWP (or DL BWP). A parameter "trpIndex" can indicate the TRP associated with each RS. Below is an example for the case where there are up to two TRPs in a SpCell. It is to be noted that parameter "trpIndex" may not be included if there is only one TRP in a serving cell. In an embodiment for the case where there are two TRPs (TRP 0 and TRP 1) in a serving cell, "trpIndex" may be included for RS associated with TRP 1 and "trpIndex" may not be included for RS associated with TRP 0. Absence of "trpIndex" may implicit mean that RS is associated with TRP 0. In an embodiment for the case where there are two TRPs ($1^{st}$ TRP 0 and $2^{nd}$ TRP) in a serving cell, "trpIndex" may be included for RS associated with second TRP and "trpIndex" may not be included for RS associated with first TRP 0. Absence of "trpIndex" may implicit mean that RS is associated with first TRP.

TABLE 3

| | |
|---|---|
| BeamFailureRecoveryConfig: = | SEQUENCE { |
| rsrp-ThresholdSSB | RSRP -Range |
| OPTIONAL, -- Need M | |
| candidateBeamRSList | SEQUENCE |
| (SIZE(1..maxNrofCandidateBeams))    OF | RACH-ResourceDedicatedBFR |
| OPTIONAL, -- Need M | |
| : | |
| } | |
| PRACH-ResourceDedicatedBFR: = | CHOICE { |
| ssb | BFR-SSB-Resource, |
| csi-RS | BFR-CSIRS-Resource |
| } | |
| BFR-SSB-Resource: = | SEQUENCE { |
| ssb | SSB -Index, |
| ra-PreambleIndex | INTEGER (0..63), |
| ..., | |
| [[ | |
| trpIndex-r17 | INTEGER (0..1) |
| OPTIONAL, -- Need S | |
| ]] | |
| } | |
| BFR-CSIRS-Resource: = | SEQUENCE { |
| csi-RS | NZP-CSI-RS-ResourceId, |
| ra-OccasionList | SEQUENCE (SIZE(1..maxRA-OccasionsPerCSIRS)) OF INTEGER (0..maxRA-Occasions-1)    OPTIONAL, -- Need R |
| ra-PreambleIndex | INTEGER (0..63) |
| OPTIONAL, -- Need R | |
| ..., | |
| [[ | |
| trpIndex-r17 | INTEGER (0..1) |
| OPTIONAL, -- Need S | |
| ]] | |
| } | |
| CandidateBeamRSListExt-r16:   = | SEQUENCE (SIZE (1..maxNrofCandidateBeamsExt-r16)) OF PRACH-ResourceDedicatedBFR |

Below Table 4 is another example for the case where there are up to two TRPs in a SCell. It is to be noted that parameter 'trpIndex' may not be included if there is only one TRP in a serving cell.

TABLE 4

| | |
|---|---|
| BeamFailureRecoverySCellConfig-r16 :: = SEQUENCE { | |
| rsrp-ThresholdBFR-r16 | RSRP-Range |
| OPTIONAL, -- Need M | |
| candidateBeamRSSCellList-r16 | SEQUENCE |
| (SIZE(1..maxNrofCandidateBeams-r16))    OF | CandidateBeamRS-r16 |
| OPTIONAL, -- Need M | |
| ... | |

TABLE 4-continued

```
    [[
    candidateBeamRSSCellList-r17                    SEQUENCE
(SIZE(1..maxNrofCandidateBeams-r17)) OF CandidateBeamRS-r17   OPTIONAL,
    ]]
    }
    CandidateBeamRS-r16: =           SEQUENCE {
        candidateBeamConfig-r16       CHOICE {
            ssb-r16                     SSB-Index,
            csi-RS-r16                  NZP-CSI-RS-
ResourceId
        },
        servingCellId                                 ServCellIndex
OPTIONAL -- Need R
    }
    CandidateBeamRS-r17: =           SEQUENCE {
        candidateBeamConfig-r17       CHOICE {
            ssb-r16                     SSB-Index,
            csi-RS-r16                  NZP-CSI-RS-
ResourceId
        },
        servingCellId                                 ServCellIndex
OPTIONAL -- Need R
        trpIndex-r17                  INTEGER (0..1)
    }
```

In an embodiment, ResourceSetIndex (or resource pool index) can be added instead of trpIndex. Based on this, a UE can identify multiple sets/pools of beam failure recovery RSs wherein RSs in same set/pool corresponds to same ResourceSetIndex/resource pool index. The set of RSs corresponding to a TRP have same ResourceSetIndex/resource pool index. In case of SpCell, the UE can also identify CFRA resources corresponding to each TRP.

In another method of this disclosure, for beam failure recovery, a gNB may signal the beam failure recovery configuration wherein list of candidate beam RSs is signaled separately for each TRP per BWP (or DL BWP) of serving cell. Below Table 5 is an example for the case where there are up to two TRPs in a serving cell. candidateBeamRSList and candidateBeamRSList2 indicates list of candidate beam RSs for different TRPs.

In an alternate embodiment, a gNB can signal BeamFailureRecoveryConfig IE separately for different TRP of a serving cell. For example, if there are two TRPs, BeamFailureRecoveryConfig/BeamFailureRecoverySCellConfig and BeamFailureRecoveryConfig1/BeamFailureRecoverySCellConfig1 can be signaled (in RRCReconfiguration message) for first TRP and second TRP respectively in BWP configuration of SpCell/SCell.

Using one of the signal methods explained above, a gNB can signal (in RRCReconfiguration message) beam failure recovery configuration for a serving cell where configuration may indicate multiple sets of candidate beam RSs, wherein each set may belong to different TRP. Upon receiving the beam failure recovery configuration from the gNB for a serving cell according to signalling explained above, a UE

TABLE 5

```
    BeamFailureRecoveryConfig ::=     SEQUENCE {
        rsrp-ThresholdSSB                    RSRP -Range
OPTIONAL, -- Need M
        candidateBeamRSList                   SEQUENCE
(SIZE(1..maxNrofCandidateBeams))   OF   PRACH-ResourceDedicatedBFR
OPTIONAL, -- Need M
        [[
        candidateBeamRSList2                              SEQUENCE
(SIZE(1..maxNrofCandidateBeams))   OF   PRACH-ResourceDedicatedBFR
OPTIONAL, -- Need M
        ]]
    }
    PRACH-ResourceDedicatedBFR ::=   CHOICE {
        ssb                               BFR-SSB-Resource,
        csi-RS                            BFR-CSIRS-Resource
    }
    BFR-SSB-Resource ::=             SEQUENCE {
        ssb                               SSB-Index,
        ra-PreambleIndex                  INTEGER (0..63),
        ...
    }
    BFR-CSIRS-Resource ::=           SEQUENCE {
        csi-RS                            NZP-CSI-RS-ResourceId,
        ra-OccasionList                   SEQUENCE (SIZE(1..maxRA-
OccasionsPerCSIRS)) OF INTEGER (0..maxRA-Occasions-1)    OPTIONAL,    --
Need R
        ra-PreambleIndex                              INTEGER (0..63)
OPTIONAL,    -- Need R
    }
``` may identify multiple sets/pools of candidate beams RSs wherein each set/pool belong to different TRPs.

Method 1:

Beam failure detection and beam failure recovery trigger for a serving cell:

Embodiment 1

Figure 4:
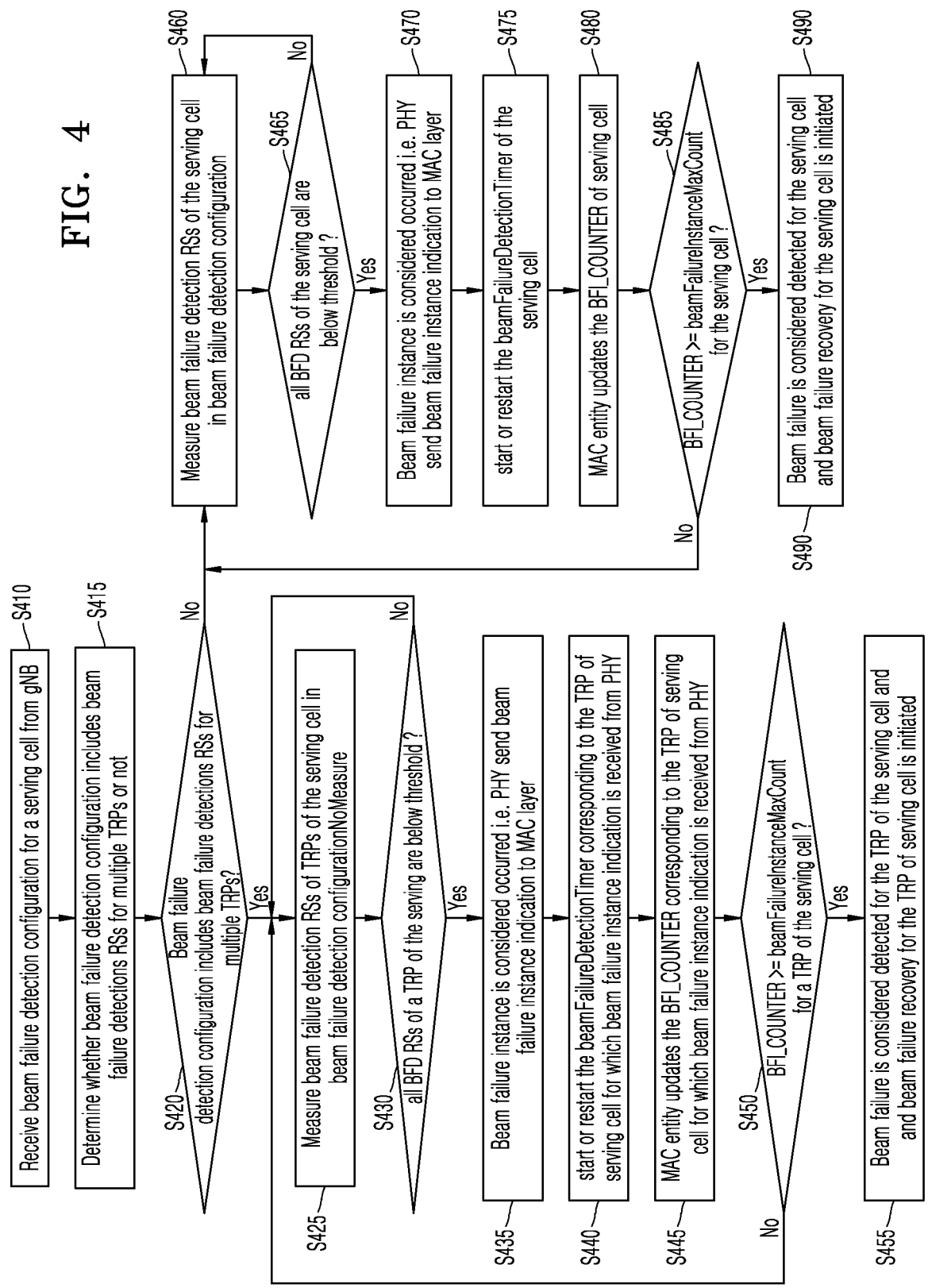
FIG. 4 is a flow chart illustrating beam failure detection and beam failure recovery according to embodiments of the present disclosure.

FIG. 4 is a flow chart illustrating beam failure detection and beam failure recovery according to embodiments of the present disclosure.

In a method of this disclosure, beam failure detection and beam failure recovery trigger for a serving cell is illustrated in FIG. 4. For beam failure detection in a serving cell, in step S410, the UE may receive beam failure detection configuration for that serving cell from a gNB as explained earlier. Beam failure detection configuration is per DL BWP of that serving cell. In step S415, the UE may determine whether the received beam failure detection configuration for the active DL BWP includes beam failure detections RSs for multiple TRPs or not.

In step S420, if the beam failure detection configuration for the active DL BWP includes beam failure detection RSs for multiple TRPs, the UE detects beam failure and trigger beam failure recovery for one or more TRPs of the serving cell as follows:

In step S425, the UE (i.e., PHY layer in the UE) measures beam failure detection RSs of TRPs of the serving cell in beam failure detection configuration periodically.

In step S430, if all BFD RSs of a TRP of the serving cell are below threshold or hypothetical PDCCH BLER determined based on measurement of beam failure detection RS is above a threshold for all beam failure detection RSs of a TRP:

In step S435, beam failure instance is considered occurred for that TRP i.e., PHY layer send a beam failure instance indication for that TRP to MAC layer (or MAC entity).

Upon receiving the beam failure instance indication from PHY layer for a TRP of the serving cell, In step S440, the MAC layer (or MAC entity) start or restart the beamFailureDetectionTimer corresponding to the TRP of the serving cell for which beam failure instance indication is received from PHY layer. beamFailureDetectionTimer is separately maintained for each TRP of serving cell. The value of beamFailureDetectionTimer is signaled by gNB. The value of beamFailureDetectionTimer can be same for all TRPs of a serving cell. Alternately, value of beamFailureDetectionTimer can be separately configured for each TRP of serving cell.

In step S445, the MAC layer update the BFI_COUNTER corresponding to the TRP of the serving cell for which beam failure instance indication is received from PHY layer. The BFI_COUNTER is separately maintained for each TRP of the serving cell.

If the BFI_COUNTER>=beamFailureInstanceMaxCount for a TRP of the serving cell (in step S450), in step S455, beam failure is considered detected for the TRP of the serving cell and beam failure recovery for the TRP of serving cell is initiated. The value of beamFailureInstanceMaxCount is signaled by gNB. The value of beamFailureInstanceMaxCount can be same for all TRPs of serving cell. Alternately, value of beamFailureInstanceMaxCount can be separately configured for each TRP of serving cell.

In step S420, if the beam failure detection configuration of the active DL BWP does not include beam failure detection RSs for multiple TRPs, the UE detects beam failure and trigger beam failure recovery as follows:

In step S460, the UE (PHY layer) measures beam failure detection RSs of the serving cell in the beam failure detection configuration periodically.

In step S465, if all BFD RSs of the serving cell are below threshold or hypothetical PDCCH BLER determined based on measurement of beam failure detection RS is above a threshold for all beam failure detection RSs of the serving cell:

In step S470, beam failure instance is considered occurred i.e., PHY layer send beam failure instance indication to MAC layer (or MAC entity)

Upon receiving the beam failure instance indication from PHY layer for a serving cell, In step S475, MAC layer start or restart the beamFailureDetectionTimer of serving cell for which beam failure instance indication is received from PHY layer. One beamFailureDetectionTimer is maintained for the serving cell.

In step S480, MAC layer may update the BFI_COUNTER of serving cell for which beam failure instance indication is received from PHY layer. One BFI_COUNTER is maintained for the serving cell.

If BFI_COUNTER>=beamFailureInstanceMaxCount for the serving cell (in step S485), in step S490, beam failure is considered detected for the serving cell and beam failure recovery for the serving cell is initiated Embodiment 2

Figure 5:
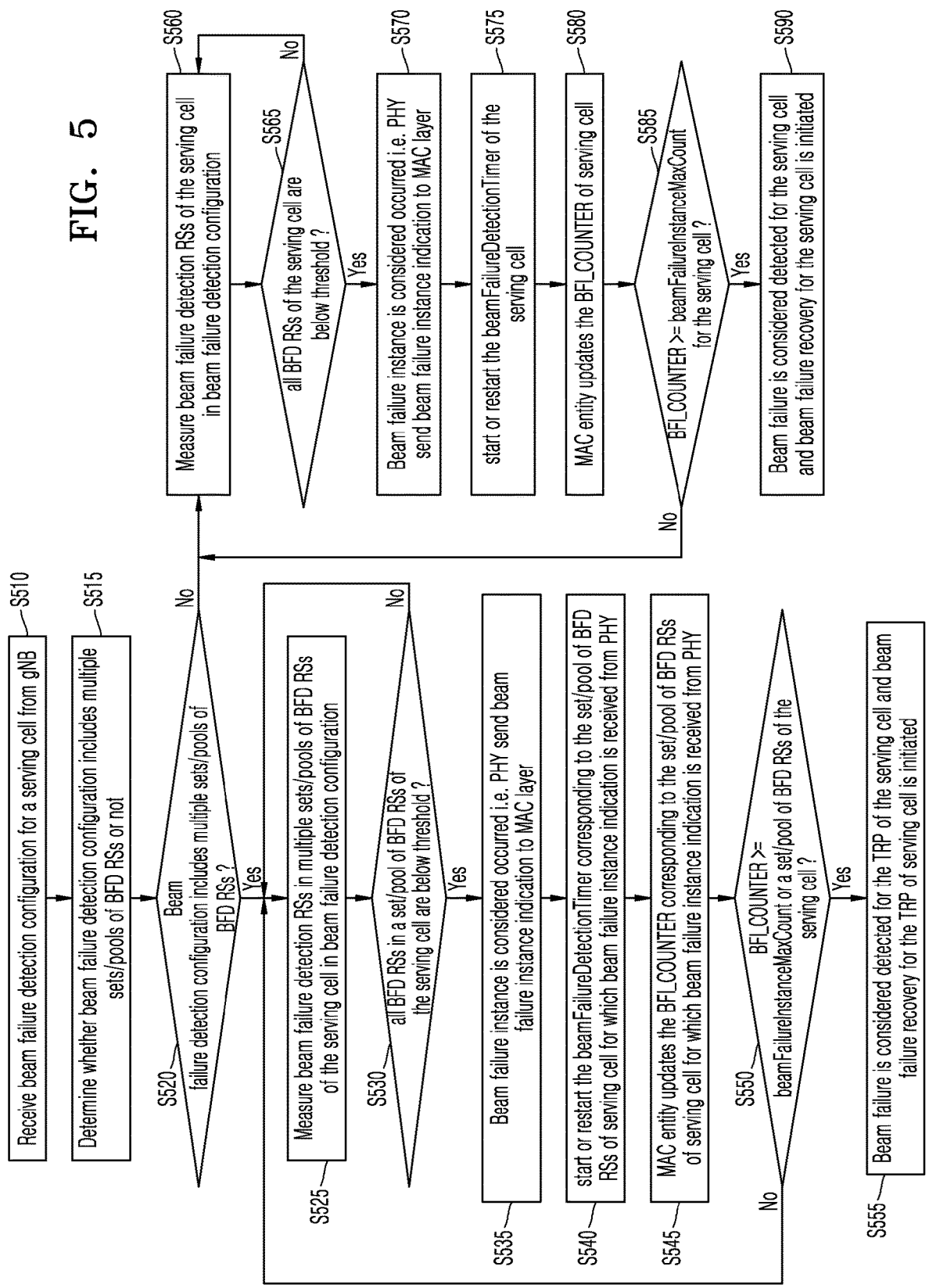
FIG. 5 is a flow chart illustrating beam failure detection and beam failure recovery according to embodiments of the present disclosure.

FIG. 5 is a flow chart illustrating beam failure detection and beam failure recovery according to embodiments of the present disclosure.

In a method of this disclosure, beam failure detection and beam failure recovery trigger for a serving cell is illustrated in FIG. 5. For beam failure detection in a serving cell, in step S510, a UE may receive beam failure detection configuration for that serving cell from a gNB as explained earlier. Beam failure detection configuration is per DL BWP of that serving cell. In step S515, the UE determines whether the received beam failure detection configuration for the active DL BWP includes multiple sets/pools of beam failure detections RSs or not.

In step S520, if the beam failure detection configuration for the active DL BWP includes multiple sets/pools of beam failure detection RSs, the UE detect beam failure and trigger beam failure recovery for one or more TRPs (i.e., one or more sets/pools of BFD RSs) of the serving cell as follows:

In step S525, the UE (i.e., PHY layer in the UE) measures beam failure detection RSs in multiple sets/pools of BFD RSs of the serving cell in beam failure detection configuration periodically.

In step S530, if all BFD RSs in a set/pool of BFD RSs of the serving cell are below threshold or hypothetical PDCCH BLER determined based on measurement of beam failure detection RS is above a threshold for all beam failure detection RSs in a set/pool of BFD RSs:

In step S535, beam failure instance is considered occurred i.e., PHY send a beam failure instance indication for that set/pool of BFD RSs to MAC layer (or MAC entity).

Upon receiving the beam failure instance indication for the set/pool of BFD RSs of the serving cell from PHY layer, In step S540, the MAC layer start or restart the beamFailureDetectionTimer corresponding to the set/pool of BFD RSs of serving cell for which beam failure instance indication is received from PHY. beamFailureDetectionTimer is separately maintained for each set/pool of BFD RSs of serving cell. The value of beamFailureDetectionTimer is signaled by a gNB. The value of beamFailureDetectionTimer can be same for all sets/pools of BFD RSs of a serving cell. Alternately, value of beamFailureDetectionTimer can be separately configured for each set/pool of BFD RSs of serving cell.

In step S545, the MAC layer update the BFI_COUNTER corresponding to the set/pool of BFD RSs of serving cell for which beam failure instance indication is received from PHY layer. The BFI_COUNTER may be separately maintained for each set/pool of BFD RSs of serving cell.

If the BFI_COUNTER>=beamFailureInstanceMaxCount for a set/pool of BFD RSs of the serving cell (in step S550), in step S555, beam failure is considered detected for set/pool of BFD RSs of the serving cell and beam failure recovery for the set/pool of BFD RSs of the serving cell is initiated. The value of beamFailureInstanceMaxCount is signaled by a gNB. The value of beamFailureInstanceMaxCount can be same for all sets/pools of BFD RSs of serving cell. Alternately, value of beamFailureInstanceMaxCount can be separately configured for each set/pool of BFD RSs of serving cell.

In step S520, if the beam failure detection configuration does not include beam failure detection RSs for multiple sets/pools of BFD RSs, the UE detects beam failure and trigger beam failure recovery as follows:

In step S560, the UE (PHY layer) may measure beam failure detection RSs of the serving cell in the beam failure detection configuration periodically.

In step S565, if all BFD RSs of the serving cell are below threshold or hypothetical PDCCH BLER determined based on measurement of beam failure detection RS is above a threshold for all beam failure detection RSs of the serving cell:

In step S570, beam failure instance is considered occurred i.e., PHY layer send beam failure instance indication to MAC layer Upon receiving the beam failure instance indication from PHY layer for a serving cell, In step S575, MAC layer start or restart the beamFailureDetectionTimer of serving cell for which beam failure instance indication is received from PHY layer. One beamFailureDetectionTimer is maintained for the serving cell.

In step S580, MAC layer update the BFI_COUNTER of serving cell for which beam failure instance indication is received from PHY. One BFI_COUNTER is maintained for the serving cell.

If BFI_COUNTER>=beamFailureInstanceMaxCount for the serving cell (in step S585), in step S590, beam failure is considered detected for the serving cell and beam failure recovery for the serving cell is initiated. A UE performs the beam failure recovery procedure for the serving cell.

Beam failure recovery procedure for a SCell supporting multiple TRPs (Note that embodiments disclosed herein for SCell can also be applied to SpCell):

Embodiment 1

Figure 6:
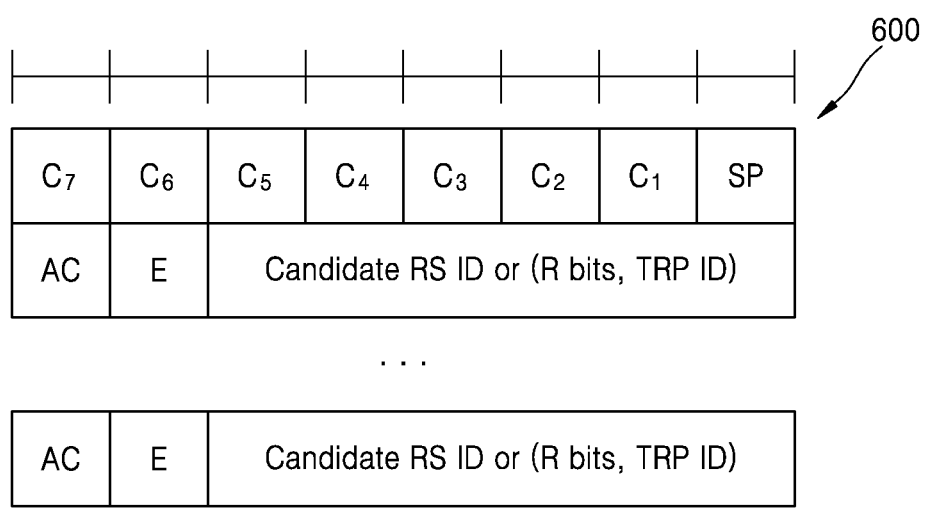
FIG. 6 illustrates enhanced format of BFR MAC CE according to embodiments of the present disclosure.
Figure 7:
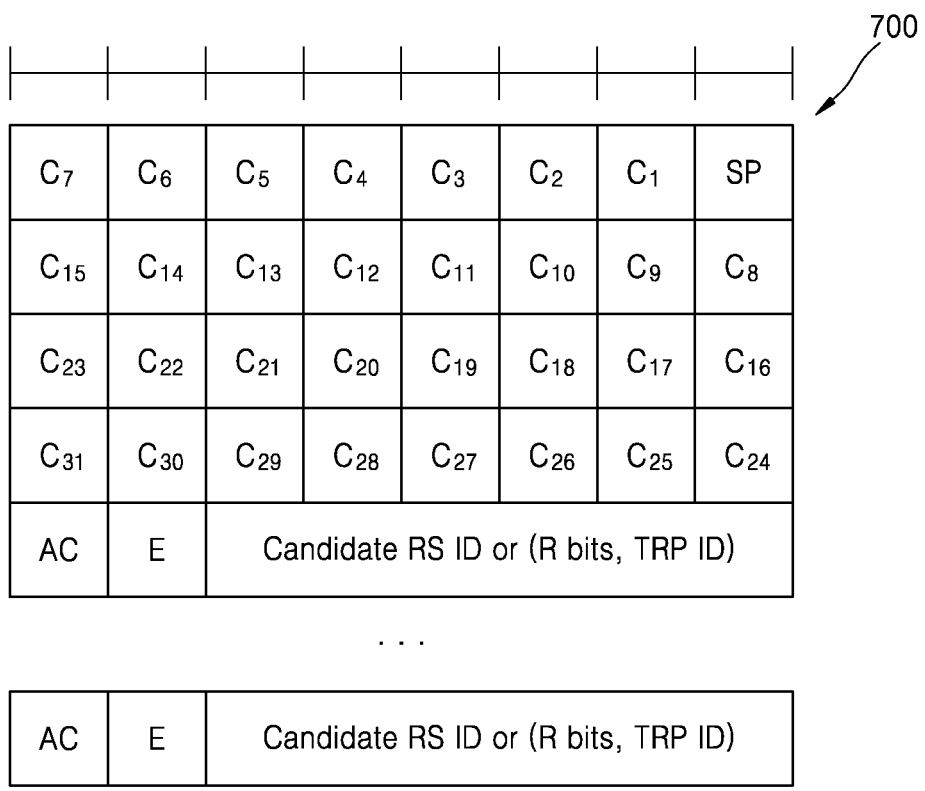
FIG. 7 illustrates enhanced format of BFR MAC CE according to embodiments of the present disclosure.

FIG. 6 and FIG. 7 illustrate enhanced format of BFR MAC CE according to embodiments of the present disclosure. FIG. 6 illustrates BFR MAC CE and truncated BFR MAC CE with the highest ServCellIndex of this MAC entity's SCell configured with BFD is less than 8. FIG. 7 illustrates BFR MAC CE and truncated BFR MAC CE with the highest ServCellIndex of this MAC entity's SCell configured with BFD is equal to or higher than 8.

In some embodiments, if BFD criteria is met for one or more TRP(s) of SCell (i.e., BFD is detected for one or more TRPs of SCell as explained earlier), the UE:

Trigger BFR for TRP(s) of SCell for which beam failure is detected

Trigger SR if UL grant is not available for transmitting BFR MAC CE or truncated BFR MAC CE or trigger SR if UL grant is available but cannot accommodate neither BFR MAC CE plus its subheader nor truncated BFR MAC CE plus its subheader. If UL grant is available and can accommodate (truncated) BFR MAC CE plus its subheader, generate and transmit (truncated) BFR MAC CE 600, 700 in UL grant. In an embodiment, SR trigger, generation and transmission of (truncated) BFR MAC CE as explained above is performed, only if there is at least one SCell for which BFR is triggered and not cancelled and evaluation of candidate beams in list of candidate beams of TRP(s) for which beam failure is detected is completed. SR configuration (PUCCH resources, SR prohibit timer, SR counter) for BFR of TRP(s) of serving cell can be separately configured from the SR configuration for BFR of serving cell.

The enhanced format of BFR MAC CE 600, 700 is shown in FIG. 6 and FIG. 7. BFR MAC CE 600, 700 may be generated by the UE (i.e., MAC layer or MAC entity in UE) as follows:

BFR MAC CE 600, 700 may include bitmap wherein each bit corresponds to a serving cell. Set bit corresponding to SCell of TRP(s) for which beam failure is detected (and evaluation of candidate beams in list of candidate beams of TRP(s) for which beam failure is detected is completed) to 1.

Add beam failure recovery information (e.g., candidate beam is available or not, candidate beam if available, TRP identification info, etc.) for each failed TRP of SCell For beam failure recovery information of a TRP of SCell for which beam failure is detected:

Set E to 1 or 0 to indicate whether beam failure recovery information of another TRP of same serving cell follows or not respectively. Note that if beam failure recovery information of only one TRP is included in BFR MAC CE, E field may not be needed/included in BFR MAC CE.

If there is no RS (SSB/CSI RS) with RSRP above threshold amongst the candidate RSs of this TRP of serving cell for which beam failure is detected (and recovery is initiated):

Set AC=0; Include TRP ID, R bits. Note that in case TRP ID is not explicitly included in beam failure detection and recovery configuration, set ID or pool ID or list ID corresponding to different sets/pools of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs. Set n/pool n/list n of BFD RSs corresponds to set n/pool n/list n of candidate beam RSs.

Else:

Set AC=1; include Candidate RS ID i.e., ID of an SSB/CSI RS of the TRP with SS-RSRP/CSI-RSRP above a threshold.

In an embodiment, candidate RS ID may be index of entry in candidate RS list corresponding to an SSB/CSI RS of the TRP with SS-RSRP/CSI-RSRP above a threshold. TRP may be implicitly identified if list is common for all TRPs. If candidate beam RS list is different for different TRPs, entries in multiple candidate beam RS lists may be sequentially indexed starting from first list. In an embodiment, TRP ID may be also included in addition to candidate RS ID. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs. Set n/pool n/list n of BFD RSs corresponds to set n/pool n/list n of candidate beam RSs. The bitmap fields in the BFR MAC CEs 600, 700 are defined as follows:

SP: this field indicates beam failure detection for the SpCell of this MAC entity. The SP field is set to 1 to indicate that beam failure is detected for SpCell. Otherwise, it is set to 0;

$C_i$ (BFR MAC CE): This field indicates beam failure detection and the presence of octet(s) containing the AC field for the SCell with ServCellIndex i. The $C_i$ field set to 1 indicates that beam failure is detected and and evaluation of candidate beams in list of candidate beams of TRP(s) for which beam failure is detected is completed and octet(s) containing the AC field is present for the SCell with ServCellIndex i. The $C_i$ field set to 0 indicates that the beam failure is not detected (or evaluation of candidate beams in list of candidate beams of TRP(s) for which beam failure is detected is not completed) and octet(s) containing the AC field is not present for the SCell with ServCellIndex i. The octets containing the AC field are present in ascending order based on the ServCellIndex;

$C_i$ (truncated BFR MAC CE): this field indicates beam failure detection for the SCell with ServCellIndex i. The $C_i$ field set to 1 indicates that beam failure is detected and evaluation of candidate beams in list of candidate beams of TRP(s) for which beam failure is detected is completed and octet(s) containing the AC field for the SCell with ServCellIndex i may be present. The $C_i$ field set to 0 indicates that the beam failure is not detected (or evaluation of candidate beams in list of candidate beams of TRP(s) for which beam failure is detected is not completed) and the octet(s) containing the AC field is not present for the SCell with ServCellIndex i. The octets containing the AC field, if present, are included in ascending order based on the ServCellIndex. The number of octets containing the AC field included is maximised, while not exceeding the available grant size;

In an embodiment, if the SCell is deactivated and SCell was configured with multiple sets/pools of BFD RSs (in the active DL BWP), a UE sets BFI_COUNTER corresponding to each set/pool of BFD RSs or corresponding to each TRP to zero; and cancel all triggered BFRs for the set/pool of BFD RSs or TRP of this serving cell.

In an embodiment, for a serving cell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this Serving Cell, a UE sets BFI_COUNTER corresponding to the set/pool of BFD RSs or the TRP to zero and cancel all triggered BFRs for the set/pool of BFD RSs or TRP of this serving cell.

In an embodiment, all BFRs triggered for set/pool of BFD RSs or TRP of an SCell may be cancelled when a MAC PDU is transmitted and this PDU includes a BFR MAC CE or truncated BFR MAC CE which contains beam failure information of that set/pool of BFD RSs or that TRP of that SCell. In an embodiment, the MAC entity may for each pending SR not triggered according to the BSR procedure for a serving Cell:

if this SR was triggered by beam failure recovery of a set/pool of BFD RSs or a TRP of a serving cell (or SCell) and a MAC PDU is transmitted and this PDU includes a BFR MAC CE or a truncated BFR MAC CE which contains beam failure recovery information of that set/pool of BFD RSs or that TRP of the serving cell (or SCell); or if this SR was triggered by beam failure recovery of a set/pool of BFD RSs or a TRP of an SCell and this SCell is deactivated: cancel the pending SR and stop the corresponding sr-ProhibitTimer, if running.

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 1A

Figure 8:
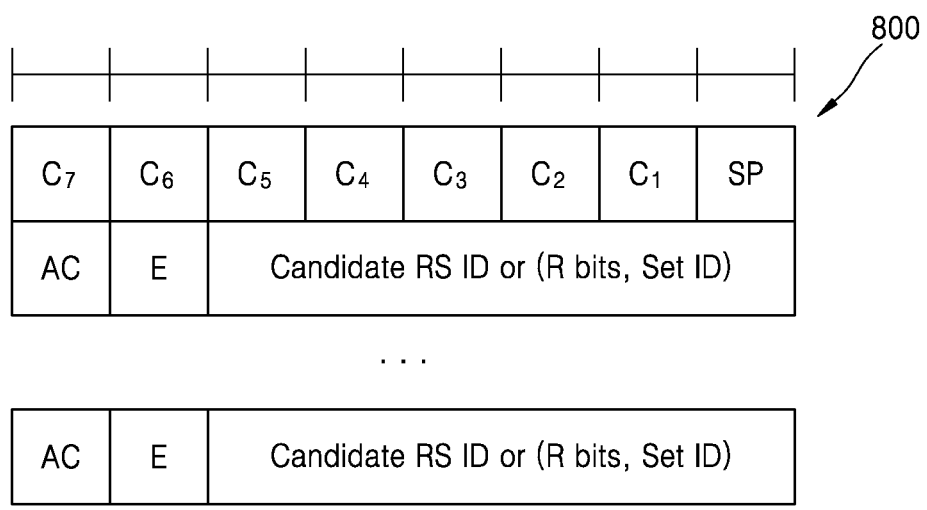
FIG. 8 illustrates enhanced format of BFR MAC CE according to embodiments of the present disclosure.
Figure 9:
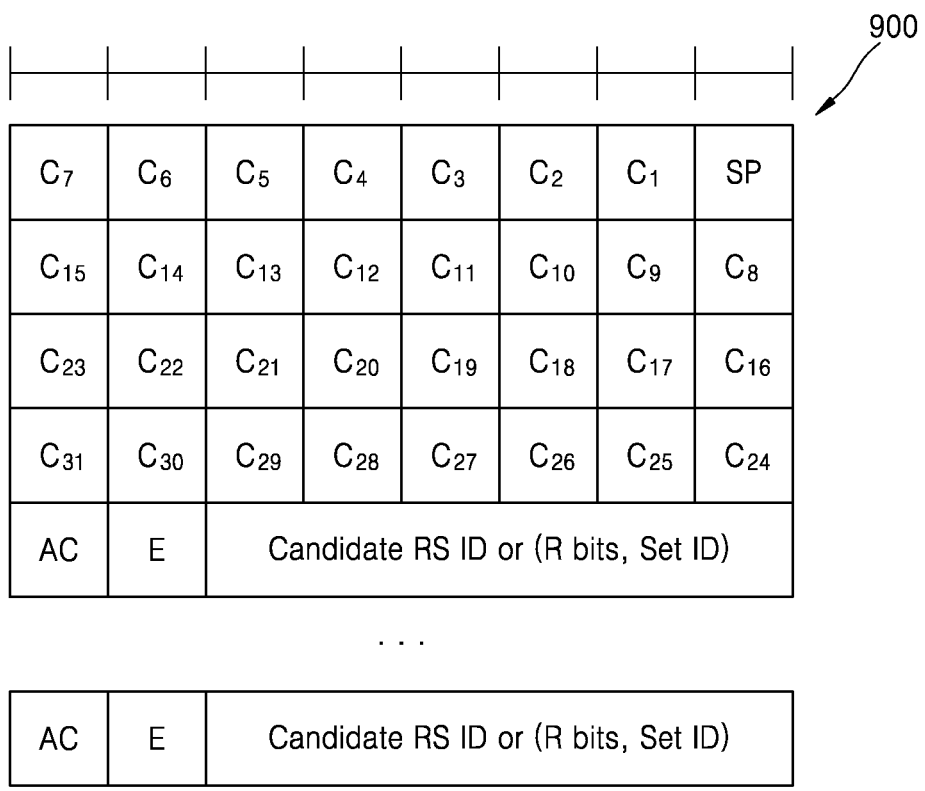
FIG. 9 illustrates enhanced format of BFR MAC CE according to embodiments of the present disclosure.

FIG. 8 and FIG. 9 illustrate enhanced format of BFR MAC CE according to embodiments of the present disclosure. FIG. 8 BFR and truncated BFR MAC CE with the highest ServCellIndex of this MAC entity's SCell configured with BFD is less than 8. Also, FIG. 9 BFR and truncated BFR MAC CE with the highest ServCellIndex of this MAC entity's SCell configured with BFD is equal to or higher than 8.

In some embodiments, if BFD criteria is met for one or more sets/pools of BFD RSs of SCell (i.e., beam failure is detected for one or more sets/pools of BFD RSs of SCell as explained earlier), the UE:

Trigger BFR for one or more sets/pools of BFD RSs of SCell for which beam failure is detected, Trigger SR if UL grant is not available for transmitting BFR MAC CE or truncated BFR MAC CE or trigger SR if UL grant is available but cannot accommodate neither BFR MAC CE plus its subheader nor truncated BFR MAC CE plus its subheader. If UL grant is available and can accommodate (truncated) BFR MAC CE plus its subheader. If UL grant is available, and can accommodate (truncated) BFR MAC CE plus its subheader, transmit (truncated) BFR MAC CE 800, 900 in UL grant. In an embodiment, SR trigger and generation and transmission of BFR MAC CE as explained above is performed, only if there is at least one SCell for which BFR is triggered and not cancelled and evaluation of candidate beam in list of candidate beams corresponding to set/pool of BFD RSs for which beam failure is detected is completed. SR configuration (PUCCH resources, SR prohibit timer, SR counter) for BFR of a set/pool of BFD RSs of serving cell can be separately configured from the SR configuration for BFR of serving cell.

The enhanced format of BFR MAC CE 800, 900 is shown in FIG. 8 and FIG. 9. BFR MAC CE 800, 900 is generated by the UE (i.e., MAC layer or MAC entity in the UE) as follows:

BFR MAC CE 800, 900 includes bitmap wherein each bit corresponds to a serving cell. Set bit corresponding to SCell of set/pool of BFD RSs for which beam failure is detected (and evaluation of candidate beams in list of candidate beams corresponding to set/pool of BFD RSs for which beam failure is detected is completed) to 1.

Add beam failure recovery information for each set/pool of BFD RSs for which beam failure is detected (i.e., one AC octet for each set/pool of BFD RSs)

For beam failure recovery information of a set/pool of BFD RSs:

Set E to 1 or 0 to indicate whether beam failure recovery information of another set/pool of BFD RSs of same serving cell follows or not respectively. Note that if beam failure recovery information of only one TRP is required to be included in BFR MAC CE, E field may not be needed/included in BFR MAC CE.

If there is no RS (SSB/CSI RS) with RSRP above threshold amongst the candidate RSs of a set/pool of candidate RSs corresponding to a set/pool of BFD RSs of serving cell for which beam failure is detected:

Set AC=0; Include set/pool ID, R bits.

Else:

Set AC=1; include candidate RS ID i.e., ID of an SSB/CSI RS with SS-RSRP/CSI-RSRP above a threshold amongst the candidate RSs of a set/pool of candidate RSs corresponding to a set/pool of BFD RSs of serving cell for which beam failure is detected In an embodiment, Candidate RS ID may be index of entry in candidate beam RS list corresponding to an SSB/CSI RS. If there are multiple candidate beam RS lists, entries in multiple candidate beam RS lists may be sequentially indexed starting from first list. In an embodiment, set/pool ID may be also included in addition to candidate RS ID. In an embodiment, set/pool ID may be also included in addition to candidate RS ID. Set 0/pool 0/list 0 of BFD RSs corresponds to Set 0/pool 0/list 0 of candidate beam RSs, set 1/pool 1/list 1 of BFD RSs corresponds to set 1/pool 1/list 1 of candidate beam RSs. Set n/pool n/list n of BFD RSs corresponds to set n/pool n/list n of candidate beam RSs.

The bitmap fields in the BFR MAC CEs 800, 900 are defined as follows:

SP: This field indicates beam failure detection for the SpCell of this MAC entity. The SP field is set to 1 to indicate that beam failure is detected for SpCell. otherwise, it is set to 0;

$C_i$ (BFR MAC CE): This field indicates beam failure detection and the presence of octet(s) containing the AC field for the SCell with ServCellIndex i. The $C_i$ field set to 1 indicates that beam failure is detected and evaluation of candidate beams in list of candidate beams corresponding to set/pool of BFD RSs (s) for which beam failure is detected is completed and octet(s) containing the AC field is present for the SCell with ServCellIndex i. The $C_i$ field set to 0 indicates that the beam failure is not detected (or evaluation of candidate beams in list of candidate beams corresponding to set/pool of BFD RSs (s) for which beam failure is detected is not completed) and octet(s) containing the AC field is not present for the SCell with ServCellIndex i. The octets containing the AC field are present in ascending order based on the ServCellIndex;

$C_i$ (truncated BFR MAC CE): This field indicates beam failure detection for the SCell with ServCellIndex i. The $C_i$ field set to 1 indicates that beam failure is detected and evaluation of candidate beams in list of candidate beams corresponding to set/pool of BFD RSs (s) for which beam failure is detected is completed and octet(s) containing the AC field for the SCell with ServCellIndex i may be present. The $C_i$ field set to 0 indicates that the beam failure is not detected (or evaluation of candidate beams in list of candidate beams corresponding to set/pool of BFD RSs (s) for which beam failure is detected is not completed) and the octet(s) containing the AC field is not present for the SCell with ServCellIndex i. The octets containing the AC field, if present, are included in ascending order based on the ServCellIndex. The number of octets containing the AC field included is maximised, while not exceeding the available grant size;

In an embodiment, if the SCell is deactivated and SCell was configured with multiple sets/pools of BFD RSs (in the active DL BWP), a UE sets BFI_COUNTER corresponding to each set/pool of BFD RSs or corresponding to each TRP to zero; and cancel all triggered BFRs for the set/pool of BFD RSs or TRP of this serving cell.

In an embodiment, for a serving cell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this Serving Cell, a UE sets BFI_COUNTER corresponding to the set/pool of BFD RSs or the TRP to zero and cancel all triggered BFRs for the set/pool of BFD RSs or TRP of this serving cell.

In an embodiment, all BFRs triggered for set/pool of BFD RSs or TRP of an SCell may be cancelled when a MAC PDU is transmitted and this PDU includes a BFR MAC CE or truncated BFR MAC CE which contains beam failure information of that set/pool of BFD RSs or that TRP of that SCell.

In an embodiment, the MAC entity may for each pending SR not triggered according to the BSR procedure for a serving cell:

if this SR was triggered by beam failure recovery of a set/pool of BFD RSs or a TRP of an serving cell (or SCell) and a MAC PDU is transmitted and this PDU includes a BFR MAC CE or a truncated BFR MAC CE which contains beam failure recovery information of that set/pool of BFD RSs or that TRP of the serving cell (or SCell); or if this SR was triggered by beam failure recovery of a set/pool of BFD RSs or a TRP of an SCell and this SCell is deactivated: cancel the pending SR and stop the corresponding sr-ProhibitTimer, if running.

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 2

Figure 10:
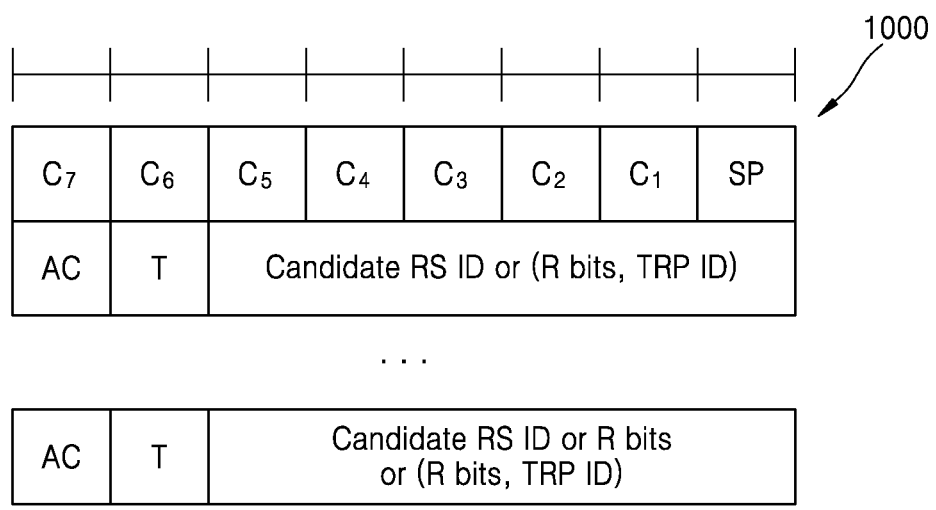
FIG. 10 illustrates enhanced format of BFR MAC CE according to embodiments of the present disclosure.
Figure 11:
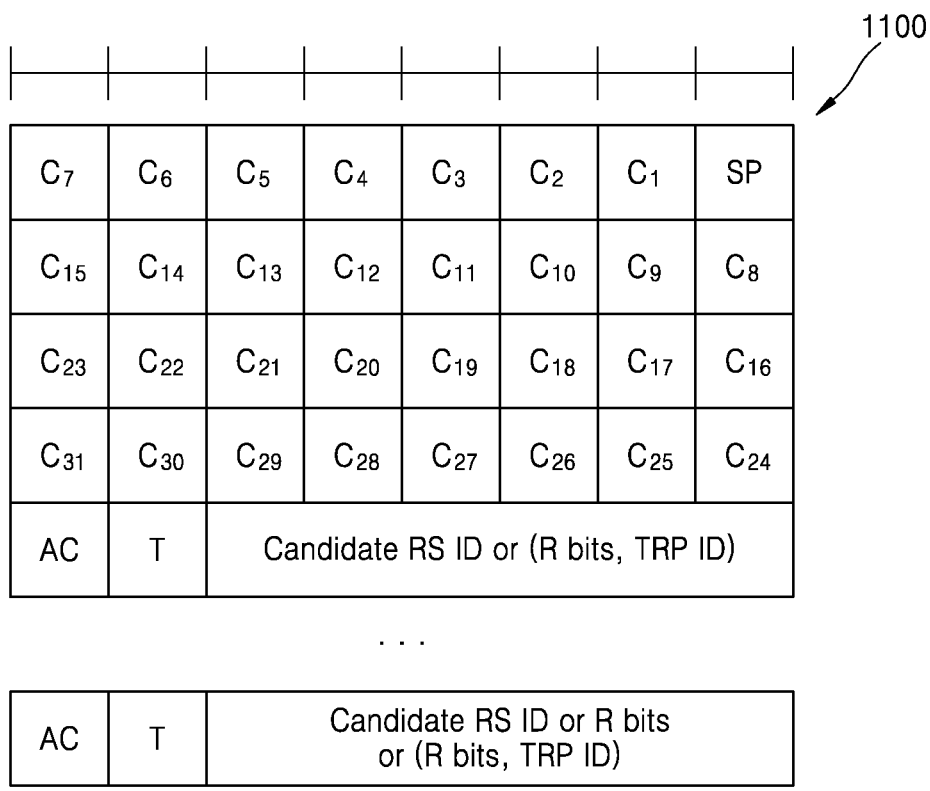
FIG. 11 illustrates enhanced format of BFR MAC CE according to embodiments of the present disclosure.

FIG. 10 and FIG. 11 illustrate enhanced format of BFR MAC CE according to embodiments of the present disclosure. FIG. 10 illustrates BFR and truncated BFR MAC CE with the highest ServCellIndex of this MAC entity's SCell configured with BFD is less than 8. Also, FIG. 11 illustrates BFR and truncated BFR MAC CE with the highest ServCellIndex of this MAC entity's SCell configured with BFD is equal to or higher than 8.

In some embodiments, if BFD criteria is met for a TRP of an SCell (i.e., beam failure is detected for a TRP of an SCell and recovery is initiated as explained earlier), the UE:
- Trigger BFR for that TRP of SCell
- Trigger SR if UL grant is not available for transmitting BFR MAC CE or truncated BFR MAC CE or trigger SR if UL grant is available but cannot accommodate neither BFR MAC CE plus its subheader nor truncated BFR MAC CE plus its subheader. If UL grant is available and can accommodate (truncated) BFR MAC CE plus its subheader, —Transmit BFR MAC CE 1000, 1100 in UL grant.

In an embodiment, SR trigger and generation and transmission of BFR MAC CE as explained above is performed, only if there is at least one SCell for which BFR is triggered and not cancelled and evaluation of candidate beam in list of candidate beams of TRP for which beam failure is detected is completed. SR configuration (PUCCH resources, SR prohibit timer, SR counter) for BFR of a TRP of serving cell can be separately configured from the SR configuration for BFR of serving cell.

The enhanced format of BFR MAC CE 1000, 1100 is shown in FIG. 10 and FIG. 11. BFR MAC CE 1000, 1100 is generated by the UE (i.e., MAC layer) as follows:
- BFR MAC CE 1000, 1100 includes bitmap wherein each bit corresponds to a serving cell. Set bit corresponding to SCell of TRP for which beam failure is detected to 1.
- Indicate BFR is for TRP of a serving cell (set T=1)
- If there is no RS (SSB/CSI RS) with RSRP above threshold amongst the RSs of the TRP of SCell for which beam failure recovery is initiated, indicate which TRP has failed in BFR MAC CE. (AC=0, T=1, TRP ID, R bits)
- Else: include candidate RS ID of TRP in BFR MAC CE. (AC=1, T=1, Candidate RS ID)
- Candidate RS ID is index of entry in candidate RS list corresponding to an SSB/CSI RS of the TRP with SS-RSRP/CSI-RSRP above a threshold. TRP can be implicitly identified as list is common for all TRPs. If candidate beam RS list is different for different TRPs, entries in multiple candidate beam RS lists can be sequentially indexed starting from first list. In an embodiment, TRP ID is also included in addition to candidate RS ID (i.e., AC=1, T=1, Candidate RS ID, TRP ID).

In an alternate embodiment, BFR MAC CE includes:
- bitmap wherein each bit corresponds to a serving cell, bit corresponding to serving cell of TRP for which beam failure is detected is set to 1.
- AC=1, candidate RS ID, TRP ID, zero or more R bits, if there is at least one RS (SSB/CSI RS) with RSRP above threshold amongst the candidate beam RSs of the set/pool of SCell for which beam failure is detected and recovery is initiated.
- AC=0, TRP ID and zero or more R bits, if there is no RS (SSB/CSI RS) with RSRP above threshold amongst the candidate beam RSs of the set/pool of SCell for which beam failure is detected and recovery is initiated.
- a reserved LCID is included in MAC subheader of BFR MAC CE where the reserved LCID is for BFR MAC CE for BFR of the TRP of serving cell. This LCID is different from LCID included in MAC subheader of BFR MAC CE for BFR of the serving cell.

In some embodiments, if BFR criteria is met for all TRPs of an SCell, the UE:
- BFR is triggered for beam failure recovery of that SCell.
- Trigger SR if UL grant is not available for transmitting BFR MAC CE or truncated BFR MAC CE or trigger SR if UL grant is available but cannot accommodate neither BFR MAC CE plus its header nor truncated BFR MAC CE plus its subheader. If UL grant is available and can accommodate (truncated) BFR MAC CE plus its header,
- Transmit BFR MAC CE 1000, 1100 in UL grant. In an embodiment, SR trigger and generation and transmission of BFR MAC CE as explained above is performed, only if there is at least one SCell for which BFR is triggered and not cancelled and evaluation of candidate beam in list of candidate beams of TRP(s) for which beam failure is detected is completed.

The enhanced format of BFR MAC CE 1000, 1100 is shown in FIG. 10 and FIG. 11. BFR MAC CE 1000, 1100 is generated by the UE (i.e., MAC layer) as follows:
- BFR MAC CE 1000, 1100 includes bitmap wherein each bit corresponds to a serving cell. Set bit corresponding to SCell for which beam failure is detected to 1.
- Indicate BFR is not for a TRP (set T=0), i.e., it is for serving cell
- If there is no RS (SSB/CSI RS) with RSRP above threshold amongst the RSs in candidate beam RS list of SCell for which beam failure recovery is initiated AC=0, T=0, R bits. In an embodiment T can be R bit set to 0.
- Else: include RS ID in BFR MAC CE 1000, 1100 AC=1, T=0, Candidate RS ID. In an embodiment T can be R bit set to 0.

The bitmap fields in the BFR MAC CEs 1000, 1100 are defined as follows:
- SP: This field indicates beam failure detection for the SpCell of this MAC entity. The SP field is set to 1 to indicate that beam failure is detected for SpCell. Otherwise, it is set to 0;
- $C_i$ (BFR MAC CE): This field indicates beam failure detection and the presence of octet containing the AC field for the SCell with ServCellIndex i. The $C_i$ field set to 1 indicates that beam failure is detected and evaluation of candidate beams in list of candidate beams of TRP(s) for which beam failure is detected is completed and octet containing the AC field is present for the SCell with ServCellIndex i. The $C_i$ field set to 0 indicates that the beam failure is not detected (or evaluation of candidate beams in list of candidate beams of TRP(s) for which beam failure is detected is not completed) and octet containing the AC field is not present for the SCell with ServCellIndex i. The octets containing the AC field are present in ascending order based on the ServCellIndex;
- $C_i$ (truncated BFR MAC CE): This field indicates beam failure detection for the SCell with ServCellIndex i. The $C_i$ field set to 1 indicates that beam failure is detected and evaluation of candidate beams in list of candidate beams of TRP(s) for which beam failure is detected is completed and octet containing the AC field for the SCell with ServCellIndex i may be present. The $C_i$ field set to 0 indicates that the beam failure is not detected (or evaluation of candidate beams in list of candidate beams of TRP(s) for which beam failure is detected is not completed) and the octet containing the AC field is not present for the SCell with ServCellIndex i. The octets containing the AC field, if present, are included in ascending order based on the ServCellIndex. The number of octets containing the AC field included is maximised, while not exceeding the available grant size;

In an embodiment, if the SCell is deactivated and SCell was configured with multiple sets/pools of BFD RSs (in the active DL BWP), a UE sets BFI_COUNTER corresponding to each set/pool of BFD RSs or corresponding to each TRP to zero; and cancel all triggered BFRs for the set/pool of BFD RSs or TRP of this serving cell.

In an embodiment, for a serving cell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this serving cell, a UE sets BFI_COUNTER corresponding to the set/pool of BFD RSs or the TRP to zero and cancel all triggered BFRs for the set/pool of BFD RSs or TRP of this serving cell.

In an embodiment, all BFRs triggered for set/pool of BFD RSs or TRP of an SCell may be cancelled when a MAC PDU is transmitted and this PDU includes a BFR MAC CE or truncated BFR MAC CE which contains beam failure information of that set/pool of BFD RSs or that TRP of that SCell.

In an embodiment, the MAC entity may for each pending SR not triggered according to the BSR procedure for a Serving Cell:

if this SR was triggered by beam failure recovery of a set/pool of BFD RSs or a TRP of an serving cell (or SCell) and a MAC PDU is transmitted and this PDU includes a BFR MAC CE or a truncated BFR MAC CE which contains beam failure recovery information of that set/pool of BFD RSs or that TRP of the serving cell (or SCell); or if this SR was triggered by beam failure recovery of a set/pool of BFD RSs or a TRP of an SCell and this SCell is deactivated: cancel the pending SR and stop the corresponding sr-ProhibitTimer, if running.

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 2A

Figure 12:
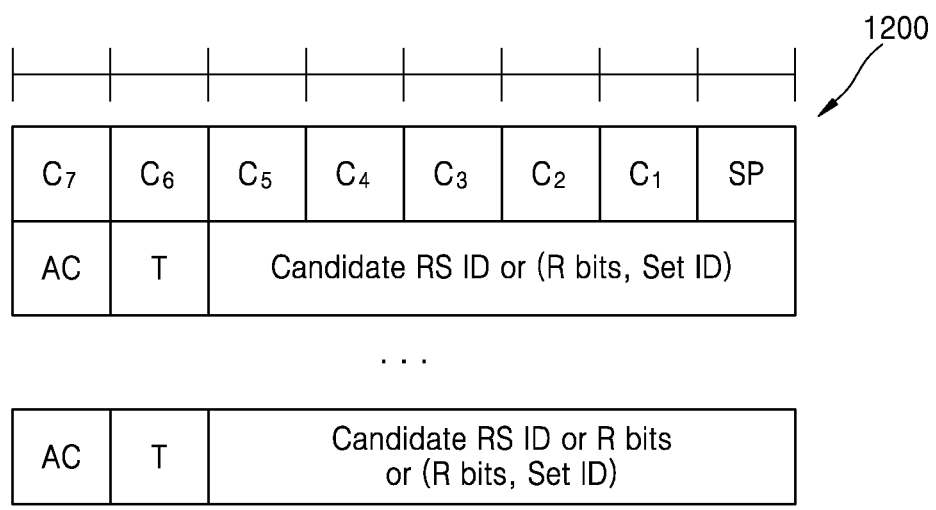
FIG. 12 illustrates enhanced format of BFR MAC CE according to embodiments of the present disclosure.
Figure 13:
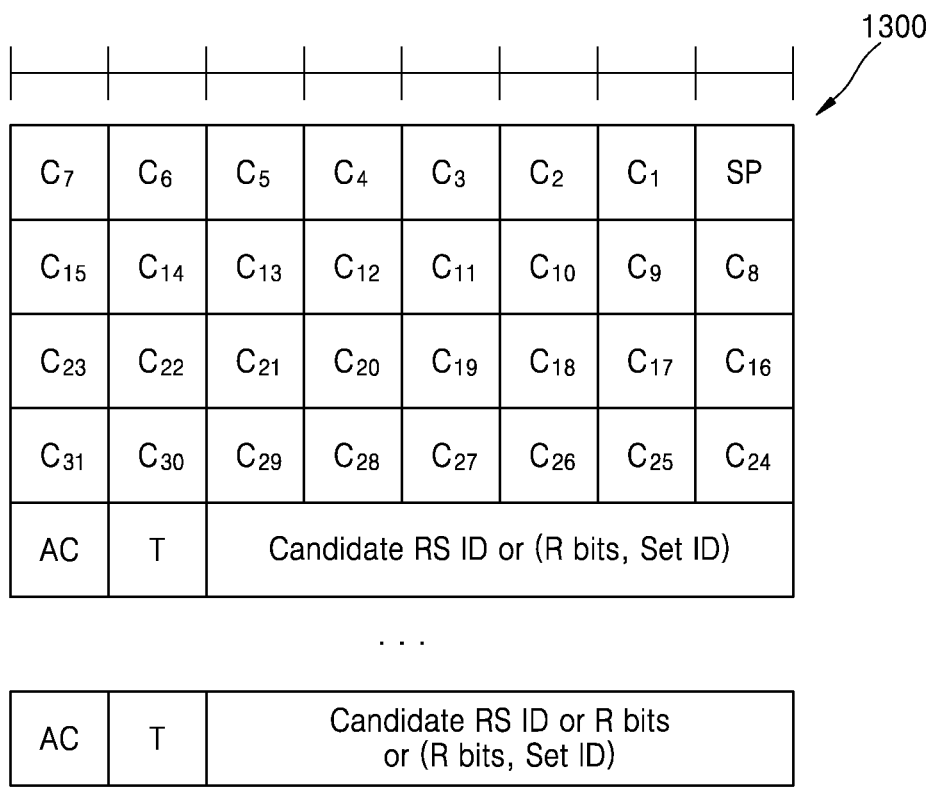
FIG. 13 illustrates enhanced format of BFR MAC CE according to embodiments of the present disclosure.

FIG. 12 and FIG. 13 illustrate enhanced format of BFR MAC CE according to embodiments of the present disclosure. FIG. 12 illustrates BFR and truncated BFR MAC CE with the highest ServCellIndex of this MAC entity's SCell configured with BFD is less than 8. Also, FIG. 13 BFR and truncated BFR MAC CE with the highest ServCellIndex of this MAC entity's SCell configured with BFD is equal to or higher than 8.

In some embodiments, if BFD criteria is met for a set/pool of BFD RSs of an SCell (i.e., beam failure is detected based on BFD RSs in a set/pool of BFD RSs of an SCell and recovery is initiated as explained earlier), the UE:
Trigger BFR for that set/pool of BFD RSs of the SCell;
Trigger SR if UL grant is not available for transmitting BFR MAC CE or truncated BFR MAC CE or trigger SR if UL grant is available but cannot accommodate neither BFR MAC CE plus its header nor truncated BFR MAC CE plus its subheader. If UL grant is available and can accommodate (truncated) BFR MAC CE plus its header; and
Transmit BFR MAC CE 1200, 1300 in UL grant. In an embodiment, SR trigger and generation and transmission of BFR MAC CE as explained above is performed, only if there is at least one SCell for which BFR is triggered and not cancelled and evaluation of candidate beam in list of candidate beams corresponding to set/pool of BFD RSs for which beam failure is detected is completed. SR configuration (PUCCH resources, SR prohibit timer, SR counter) for BFR of a set/pool of BFD RSs of serving cell can be separately configured from the SR configuration for BFR of serving cell.

The enhanced format of BFR MAC CE 1200, 1300 is shown in FIG. 12 and FIG. 13. BFR MAC CE 1200, 1300 is generated by the UE (i.e., MAC layer) as follows:
BFR MAC CE 1200, 1300 includes bitmap wherein each bit corresponds to a serving cell. Set bit corresponding to SCell for which beam failure is detected to 1.
Indicate Beam failure is detected based on BFD RSs of a set/pool of BFD RSs amongst multiple sets/pools of BFD RSs (set T=1).
If there is no RS (SSB/CSI RS) with RSRP above threshold amongst the candidate beam RSs of the set/pool of SCell for which beam failure is detected and recovery is initiated, indicate set/pool of BFD RSs based on which beam failure is detected, in BFR MAC CE. (AC=0, T=1, Set/pool ID, R bits).
Else: include candidate RS ID corresponding to the set/pool in BFR MAC CE. (AC=1, T=1, Candidate RS ID).
Candidate RS ID is index of entry in candidate RS list corresponding to an SSB/CSI RS of the set/pool with SS-RSRP/CSI-RSRP above a threshold. Set/pool can be implicitly identified if list is common for all sets/pools. In an embodiment, set/pool ID is also included.
In an alternate embodiment, BFR MAC CE includes:
bitmap wherein each bit corresponds to a serving cell, bit corresponding to serving cell for which beam failure is detected is set to 1.
AC=1, Candidate RS ID, set/pool ID, zero or more R bits, if there is at least one RS (SSB/CSI RS) with RSRP above threshold amongst the candidate beam RSs of the set/pool of SCell for which beam failure is detected and recovery is initiated.
AC=0, set/pool ID and zero or more R bits, if there is no RS (SSB/CSI RS) with RSRP above threshold amongst the candidate beam RSs of the set/pool of SCell for which beam failure is detected and recovery is initiated.
a reserved LCID is included in MAC subheader of BFR MAC CE where the reserved LCID is for BFR MAC CE for BFR of the set/pool of serving cell. This LCID is different from LCID included in MAC subheader of BFR MAC CE for BFR of the serving cell.
In some embodiments, if BFR criteria is met for all sets/pools of BFD RSs of an SCell:
SCell BFR is triggered for that SCell.
Trigger SR if UL grant is not available for transmitting BFR MAC CE or truncated BFR MAC CE or trigger SR if UL grant is available but cannot accommodate neither BFR MAC CE plus its header nor truncated BFR MAC CE plus its subheader. If UL grant is available and can accommodate (truncated) BFR MAC CE plus its header,
transmit BFR MAC CE 1200, 1300 in UL grant.
In an embodiment, SR trigger and generation and transmission of BFR MAC CE as explained above is performed, only if there is at least one SCell for which BFR is triggered and not cancelled and evaluation of candidate beam in list of candidate beams corresponding to sets/pools of BFD RSs for which beam failure is detected is completed.

The enhanced format of BFR MAC CE 1200, 1300 is shown in FIG. 12 and FIG. 13. BFR MAC CE 1200, 1300 is generated by the UE (i.e., MAC layer) as follows:

BFR MAC CE 1200, 1300 includes bitmap wherein each bit corresponds to a serving cell. Set bit corresponding to SCell for which beam failure is detected to 1.

Indicate BFR is not for a specific set/pool (set T=0).

If there is no RS (SSB/CSI RS) with RSRP above threshold amongst the RSs in candidate beam RS list of SCell for which beam failure recovery is initiated.
  AC=0, T=0, R bits. In an embodiment T can be R bit set to 0.

Else: include RS ID in BFR MAC CE 1200, 1300.
  AC=1, T=0, Candidate RS D. In an embodiment T can be R bit set to 0.

The bitmap fields in the BFR MAC CEs 1200, 1300 are defined as follows:

SP: This field indicates beam failure detection for the SpCell of this MAC entity. The SP field is set to 1 to indicate that beam failure is detected for SpCell. otherwise, it is set to 0;

$C_i$ (BFR MAC CE): This field indicates beam failure detection and the presence of octet containing the AC field for the SCell with ServCellIndex i. The $C_i$ field set to 1 indicates that beam failure is detected and evaluation of candidate beams in list of candidate beams corresponding to set(s)/pool(s) of BFD RSs for which beam failure is detected is completed and octet containing the AC field is present for the SCell with ServCellIndex i. The $C_i$ field set to 0 indicates that the beam failure is not detected (or and evaluation of candidate beams in list of candidate beams corresponding to set(s)/pool(s) of BFD RSs for which beam failure is detected is not completed) and octet containing the AC field is not present for the SCell with ServCellIndex i. The octets containing the AC field are present in ascending order based on the ServCellIndex;

$C_i$ (truncated BFR MAC CE): This field indicates beam failure detection for the SCell with ServCellIndex i. The $C_i$ field set to 1 indicates that beam failure is detected and evaluation of candidate beams in list of candidate beams corresponding to set(s)/pool(s) of BFD RSs for which beam failure is detected is completed and octet containing the AC field for the SCell with ServCellIndex i may be present. The $C_i$ field set to 0 indicates that the beam failure is not detected (evaluation of candidate beams in list of candidate beams corresponding to set(s)/pool(s) of BFD RSs for which beam failure is detected is not completed) and the octet containing the AC field is not present for the SCell with ServCellIndex i. The octets containing the AC field, if present, are included in ascending order based on the ServCellIndex. The number of octets containing the AC field included is maximised, while not exceeding the available grant size.

In an embodiment, if the SCell is deactivated and SCell was configured with multiple sets/pools of BFD RSs (in the active DL BWP), a UE sets BFI_COUNTER corresponding to each set/pool of BFD RSs or corresponding to each TRP to zero; and cancel all triggered BFRs for the set/pool of BFD RSs or TRP of this serving cell.

In an embodiment, for a serving cell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this serving cell, a UE sets BFI_COUNTER corresponding to the set/pool of BFD RSs or the TRP to zero and cancel all triggered BFRs for the set/pool of BFD RSs or TRP of this serving cell.

In an embodiment, all BFRs triggered for set/pool of BFD RSs or TRP of an SCell may be cancelled when a MAC PDU is transmitted and this PDU includes a BFR MAC CE or truncated BFR MAC CE which contains beam failure information of that set/pool of BFD RSs or that TRP of that SCell.

In an embodiment, the MAC entity may for each pending SR not triggered according to the BSR procedure for a serving cell: if this SR was triggered by beam failure recovery of a set/pool of BFD RSs or a TRP of an serving cell (or SCell) and a MAC PDU is transmitted and this PDU includes a BFR MAC CE or a truncated BFR MAC CE which contains beam failure recovery information of that set/pool of BFD RSs or that TRP of the serving cell (or SCell); or if this SR was triggered by beam failure recovery of a set/pool of BFD RSs or a TRP of an SCell and this SCell is deactivated: cancel the pending SR and stop the corresponding sr-ProhibitTimer, if running.

It is to be noted that beam failure recovery of a set/pool of BFD RSs or a TRP of a serving cell can also be referred as M-TRP BFR for the serving cell or partial BFR for the serving cell or enhanced BFR for the serving cell.

Beam failure recovery procedure for a SpCell supporting multiple TRPs:

Embodiment 1

In some embodiments, if beam failure is detected for a TRP of SpCell as explained earlier, the UE initiates beam failure recovery for a TRP of SpCell:
  Trigger random access on SpCell.
  If there is at least one RS (SSB/CSI RS) with RSRP above threshold amongst the candidate beam RSs associated with TRP of SpCell for which beam failure recovery is initiated, perform CFRA.
  Else, the UE:
    Performs CBRA.
    Generates BFR MAC CE. BFR MAC CE includes bitmap wherein each bit corresponds to a serving cell. Set bit corresponding to SpCell to 1.
    Indicates which TRP of SpCell has failed in BFR MAC CE. For example, formats of BFR MAC CE 600, 700 shown in FIG. 6 and FIG. 7 and other formats as explained in embodiment 1 of Beam failure recovery procedure for a SCell supporting multiple TRPs may be used. TRP ID of TRP for which beam failure is detected is included in BFR MAC CE.

In some embodiments, else if beam failure is detected for all TRPs of SpCell as explained earlier, the UE initiates beam failure recovery for SpCell:
  Trigger random access on SpCell.
  If there is at least one RS (SSB/CSI RS) with RSRP above threshold amongst the RSs in candidate beam RS list of SpCell, perform CFRA.
  Else, the UE:
    Performs CBRA.
    Generates BFR MAC CE.
      BFR MAC CE includes bitmap wherein each bit corresponds to a serving cell. Set bit (SP bit) corresponding to SpCell to 1.

In an embodiment, beam failure recovery info is not included for SpCell.

In an alternate embodiment, beam failure recovery info of failed TRP(s) can be included. For example, formats of BFR MAC CE 600, 700 shown in FIG. 6 and FIG. 7 may be used to indicate beam failure recovery info. Various fields can be set in similar manner as in case where FIG. 6 and FIG. 7 are used for SCell BFR.

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 1A

In some embodiments, if beam failure is detected for a set/pool of BFD RSs of SCell of SpCell as explained earlier, the UE initiates beam failure recovery for a set/pool of BFD RSs:
Trigger random access on SpCell.
If there is at least one RS (SSB/CSI RS) with RSRP above threshold amongst the candidate beam RSs of set/pool corresponding to the set/pool of BFD RSs of SpCell for which beam failure recovery is initiated, perform CFRA.
Else, the UE:
Performs CBRA.
Generates BFR MAC CE. BFR MAC CE includes bitmap wherein each bit corresponds to a serving cell. Set bit (SP bit) corresponding to SpCell to 1.
Indicates which set/pool of BFD RSs based on which beam failure is detected in BFR MAC CE. For example, formats of BFR MAC CE 800, 900 shown in FIG. 8 and FIG. 9 and other formats as explained in embodiment 1A of Beam failure recovery procedure for a SCell supporting multiple TRPs may or be used. set/pool ID of set for which beam failure is detected is included in BFR MAC CE.

In some embodiments, else if beam failure is detected for all sets/pools of BFD RSs of SpCell as explained earlier, a UE initiates beam failure recovery for SpCell:
Trigger random access on SpCell.
If there is at least one RS (SSB/CSI RS) with RSRP above threshold amongst the RSs in candidate beam RS list of SpCell, perform CFRA.
Else
Performs CBRA.
Generates BFR MAC CE.
BFR MAC CE includes bitmap wherein each bit corresponds to a serving cell. Set bit (SP bit) corresponding to SpCell to 1.
In an embodiment, beam failure recovery info is not included for SpCell.
In an alternate embodiment, Beam failure recovery info of failed TRP(s) i.e., sets/pools/lists of BFD RSs for which beam failure is detected can be included. For example, formats of BFR MAC CE 800, 900 shown in FIG. 8 and FIG. 9 and other formats as explained in embodiment 1A of Beam failure recovery procedure for a SCell supporting multiple TRPs can be used to indicate beam failure recovery info. Various fields can be set in similar manner as in case where FIG. 8 and FIG. 9 are used for SCell BFR.

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 2

In some embodiments, if beam failure is detected for a TRP of SpCell as explained earlier, the UE:
Triggers BFR for TRP of SpCell.
Triggers SR if UL grant is not available for transmitting BFR MAC CE or truncated BFR MAC CE or trigger SR if UL grant is available but cannot accommodate neither BFR MAC CE plus its subheader nor truncated BFR MAC CE plus its subheader.
If UL grant is available and can accommodate (truncated) BFR MAC CE plus its subheader, transmit (truncated) BFR MAC CE in UL grant.

In an embodiment, SR trigger and generation and transmission of BFR MAC CE as explained above is performed, only if there is at least one serving for which BFR is triggered and not cancelled and evaluation of candidate beam in list of candidate beams of TRP(s) for which beam failure is detected is completed.

The enhanced format of BFR MAC CE 1000, 1100 is shown in FIG. 10 and FIG. 11. BFR MAC CE is generated as follows:
Indicate BFR is for TRP (set T=1).
If there is no RS (SSB/CSI RS) with RSRP above threshold amongst the RSs of the TRP of SPCell for which beam failure recovery is initiated, indicate which TRP has failed in BFR MAC CE. (AC=0, T=1, TRP ID, R bits).
Else: include RS ID of TRP in BFR MAC CE. (AC=1, T=1, Candidate RS ID)
In an embodiment, candidate RS ID may be index of entry in candidate RS list corresponding to an SSB/CSI RS of the TRP with SS-RSRP/CSI-RSRP above a threshold. TRP may be implicitly identified if list is common for all TRPs. If candidate beam RS list is different for different TRPs, entries in multiple candidate beam RS lists may be sequentially indexed starting from first list.
In an embodiment, TRP ID may be also included in addition to candidate RS ID. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs.
In an alternate embodiment, BFR MAC CE includes:
bitmap wherein each bit corresponds to a serving cell, bit corresponding to SpCell for which beam failure is detected is set to 1.
AC=1, Candidate RS ID, TRP ID, zero or more R bits, if there is at least one RS (SSB/CSI RS) with RSRP above threshold amongst the candidate beam RSs of the TRP of SpCell for which beam failure is detected and recovery is initiated.
AC=0, TRP ID and zero or more R bits, if there is no RS (SSB/CSI RS) with RSRP above threshold amongst the candidate beam RSs of the TRP of SpCell for which beam failure is detected and recovery is initiated.

a reserved LCD is included in MAC subheader of BFR MAC CE where the reserved LCID is for BFR MAC CE for BFR of the TRP of serving cell. This LCID is different from LCID included in MAC subheader of BFR MAC CE for BFR of the serving cell.

In some embodiments, else if beam failure is detected for all TRPs of SpCell as explained earlier, the UE initiates beam failure recovery for SpCell:
Triggers random access on SpCell.
If there is at least one RS (SSB/CSI RS) with RSRP above threshold amongst the RSs in candidate beam RS list of SpCell, perform CFRA.
Else, the UE:
Performs CBRA.
Generates BFR MAC CE.
BFR MAC CE includes bitmap wherein each bit corresponds to a serving cell. Set bit corresponding to SpCell to 1.
In an embodiment, Beam failure recovery info is not included for SpCell
In an alternate embodiment, beam failure recovery info of failed TRP(s) can be included. For example, formats of BFR MAC CE 600, 700 shown in FIG. 6 and FIG. 7 may be used to indicate beam failure recovery info. Various fields can be set in similar manner as in case where FIG. 6 and FIG. 7 are used for SCell BFR and other formats as explained in embodiment 1 of Beam failure recovery procedure for a SCell supporting multiple TRPs.
Note that in an embodiment, even in CFRA case BFR MAC CE can be generated and transmitted in MsgA or Msg3 to include BFR info of other TRP or both TRPs.

In an embodiment, for a BFR of TRP or set/pool of BFD RSs of SpCell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this serving cell, a UE sets BFI_COUNTER corresponding to the set/pool of BFD RSs or the TRP to zero and cancel all triggered BFRs for the set/pool of BFD RSs or TRP of this serving cell and consider BFR of TRP or set/pool of BFD RSs of SpCell successfully completed.

In an embodiment, all BFRs triggered for set/pool of BFD RSs or TRP of an SPCell may be cancelled when a MAC PDU is transmitted and this PDU includes a BFR MAC CE or truncated BFR MAC CE which contains beam failure information of that set/pool of BFD RSs or that TRP of that SPCell.

In an embodiment, the MAC entity may for each pending SR not triggered according to the BSR procedure for a Serving Cell:
if this SR was triggered by beam failure recovery of a set/pool of BFD RSs or a TRP of a serving cell (or SCell) and a MAC PDU is transmitted and this PDU includes a BFR MAC CE or a Truncated BFR MAC CE which contains beam failure recovery information of that set/pool of BFD RSs or that TRP of the serving cell (or SCell);

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 2A

In some embodiments, if beam failure is detected for a set/pool of BFD RSs of SpCell as explained earlier, the UE:

Triggers BFR for set/pool of BFD RSs of SpCell.

Trigger SR if UL grant is not available for transmitting BFR MAC CE or truncated BFR MAC CE or trigger SR if UL grant is available but cannot accommodate neither BFR MAC CE plus its header nor truncated BFR MAC CE plus its subheader. can accommodate (truncated) BFR MAC CE plus its header.

If UL grant is available and can accommodate (truncated) BFR MAC CE plus its header, transmit BFR MAC CE in UL grant. The enhanced format of BFR MAC CE 1200, 1300 is shown in FIG. 12 and FIG. 13. BFR MAC CE is generated as follows:

Indicate beam failure is detected based on a set/pool of BFD RSs amongst multiple sets/pools of BFD RSs (Set T=1).

If there is no RS (SSB/CSI RS) with RSRP above threshold amongst the candidate RSs corresponding to the set/pool for which beam failure is detected and for which beam failure recovery is initiated, indicate the set/pool for which beam failure is detected and for which beam failure recovery is initiated, in BFR MAC CE. (AC=0, T=1, Set ID, R bits).

Else: include RS ID of candidate RS from the candidate beam RSs of the set/pool for which beam failure is detected in BFR MAC CE. (AC=1, T=1, Candidate RS ID)

Candidate RS ID is index of entry in candidate RS list. In an embodiment, candidate RS ID may be index of entry in candidate RS list corresponding to an SSB/CSI RS of the TRP with SS-RSRP/CSI-RSRP above a threshold. TRP may be implicitly identified if list is common for all TRPs. If candidate beam RS list is different for different TRPs, entries in multiple candidate beam RS lists may be sequentially indexed starting from first list. In an embodiment, TRP ID may be also included in addition to candidate RS ID. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs.

In an alternate embodiment, BFR MAC CE includes:

bitmap wherein each bit corresponds to a serving cell, bit corresponding to SpCell for which beam failure is detected is set to 1.

AC=1, Candidate RS ID, TRP ID, zero or more R bits, if there is at least one RS (SSB/CSI RS) with RSRP above threshold amongst the candidate beam RSs of the set/pool of SpCell for which beam failure is detected and recovery is initiated.

AC=0, TRP ID and zero or more R bits, if there is no RS (SSB/CSI RS) with RSRP above threshold amongst the candidate beam RSs of the set/pool of SpCell for which beam failure is detected and recovery is initiated.

a reserved LCID is included in MAC subheader of BFR MAC CE where the reserved LCID is for BFR MAC CE for BFR of the TRP of serving cell. This LCID is different from LCID included in MAC subheader of BFR MAC CE for BFR of the serving cell.

else if beam failure is detected for all sets/pools of BFD RSs of SpCell as explained earlier, the UE initiates beam failure recovery for SpCell:
 Triggers random access on SpCell.
 If there is at least one RS (SSB/CSI RS) with RSRP above threshold amongst the RSs in candidate beam RS list of SpCell, perform CFRA.
 Else, the UE may:
  Perform CBRA.
  Generate BFR MAC CE.
   BFR MAC CE includes bitmap wherein each bit corresponds to a serving cell. Set bit corresponding to SpCell to 1.
   In an embodiment, beam failure recovery info is not included for SpCell.
   In an alternate embodiment, Beam failure recovery info of failed TRP(s) i.e., sets/pools/lists of BFD RSs for which beam failure is detected can be included. For example, formats of BFR MAC CE 1200, 1300 shown in FIG. 12 and FIG. 13 may be used to indicate beam failure recovery info. Various fields can be set in similar manner as in case where FIG. 12 and FIG. 13 are used for SCell BFR.

Note that in an embodiment, even in CFRA case BFR MAC CE can be generated and transmitted in MsgA or Msg3 to include BFR info of other set/pool or both sets/pools.

In an embodiment, for a BFR of TRP or set/pool of BFD RSs of SpCell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this serving cell, a UE sets BFI_COUNTER corresponding to the set/pool of BFD RSs or the TRP to zero and cancel all triggered BFRs for the set/pool of BFD RSs or TRP of this serving cell and consider BFR of TRP or set/pool of BFD RSs of SpCell successfully completed.

In an embodiment, all BFRs triggered for set/pool of BFD RSs or TRP of an SPCell may be cancelled when a MAC PDU is transmitted and this PDU includes a BFR MAC CE or truncated BFR MAC CE which contains beam failure information of that set/pool of BFD RSs or that TRP of that SPCell.

In an embodiment, the MAC entity may for each pending SR not triggered according to the BSR procedure for a Serving Cell:
 if this SR was triggered by beam failure recovery of a set/pool of BFD RSs or a TRP of a serving cell (or SCell) and a MAC PDU is transmitted and this PDU includes a BFR MAC CE or a truncated BFR MAC CE which contains beam failure recovery information of that set/pool of BFD RSs or that TRP of the serving cell (or SCell);

It is to be noted that beam failure recovery of a set/pool of BFD RSs or a TRP of a serving cell can also be referred as M-TRP BFR for the serving cell or partial BFR for the serving cell or enhanced BFR for the serving cell.

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 3

In some embodiments, if beam failure detection indication is received for a TRP of SpCell, a configurable number of times within a timer interval or if beam failure is detected for a TRP of SpCell as explained earlier, the UE:
 Triggers BFR for TRP of SpCell
 Triggers SR if UL grant is not available for transmitting BFR MAC CE or truncated BFR MAC CE or trigger SR; if UL grant is available but cannot accommodate neither BFR MAC CE plus its header nor truncated BFR MAC CE plus its subheader; can accommodate (truncated) BFR MAC CE plus its header.
  If UL grant is available and can accommodate (truncated) BFR MAC CE plus its header, transmits BFR MAC CE in UL grant.

In an embodiment, SR trigger and generation and transmission of BFR MAC CE as explained above is performed, only if there is at least one serving cell for which BFR is triggered and not cancelled and evaluation of candidate beam in list of candidate beams of TRP for which beam failure is detected is completed.

The enhanced format of BFR MAC CE 600, 700 is shown in FIG. 6 and FIG. 7. BFR MAC CE is generated as follows:
 If there is no RS (SSB/CSI RS) with RSRP above threshold amongst the RSs of the TRP of SpCell for which beam failure recovery is initiated, indicate which TRP has failed in BFR MAC CE. (AC=0, E=0, TRP ID, R bits).
 Else: include RS ID of TRP of SpCell in BFR MAC CE. (AC=1, E=0, Candidate RS ID).
 Candidate RS ID is index of entry in candidate RS list.

In an embodiment, candidate RS ID may be index of entry in candidate RS list corresponding to an SSB/CSI RS of the TRP with SS-RSRP/CSI-RSRP above a threshold. TRP may be implicitly identified if list is common for all TRPs. If candidate beam RS list is different for different TRPs, entries in multiple candidate beam RS lists may be sequentially indexed starting from first list. In an embodiment, TRP ID may be also included in addition to candidate RS ID. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs.

else if beam failure detection indication is received for SpCell a configurable number of times within a timer interval or if beam failure is detected for all TRPs of SpCell as explained earlier, the UE initiates beam failure recovery for SpCell:
  Trigger random access on SpCell.
  If there is at least one RS (SSB/CSI RS) with RSRP above threshold amongst the RSs in candidate beam RS list of SpCell, perform CFRA.
  Else, the UE may:
   Perform CBRA.
   Generate BFR MAC CE. BFR MAC CE is transmitted in MsgA or Msg3. The enhanced format of BFR MAC CE 600, 700 is shown in FIG. 6 and FIG. 7. BFR MAC CE is generated as follows:
    BFR MAC CE includes bitmap wherein each bit corresponds to a serving cell. Set bit corresponding to SpCell to 1.

Add beam failure recovery information for each failed TRP (i.e., one AC octet for each failed TRP).

For beam failure recovery information of a TRP.

Set E to 1 or 0 to indicate whether beam failure recovery information of another TRP of same serving cell follows or not respectively.

If there is no RS (SSB/CSI RS) with RSRP above threshold amongst the candidate RSs of this TRP of serving cell for which beam failure recovery is initiated:

Set AC=0; Include TRP ID, R bits.

Else:

Set AC=1; include Candidate RS ID i.e., ID of an SSB/CSI RS of the TRP with SS-RSRP/CSI-RSRP above a threshold.

In an embodiment, candidate RS ID is index of entry in candidate RS list corresponding to an SSB/CSI RS of the TRP with SS-RSRP/CSI-RSRP above a threshold. TRP can be implicitly identified as list is common for all TRPs. In an embodiment, TRP ID is also included.

Note that in an embodiment, even in CFRA case BFR MAC CE can be generated and transmitted in MsgA or Msg3 to include BFR info of other TRP or both TRPs.

In an embodiment, for a BFR of TRP or set/pool of BFD RSs of SpCell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this serving cell, a UE sets BFI_COUNTER corresponding to the set/pool of BFD RSs or the TRP to zero and cancel all triggered BFRs for the set/pool of BFD RSs or TRP of this serving cell and consider BFR of TRP or set/pool of BFD RSs of SpCell successfully completed.

In an embodiment, all BFRs triggered for set/pool of BFD RSs or TRP of an SPCell may be cancelled when a MAC PDU is transmitted and this PDU includes a BFR MAC CE or truncated BFR MAC CE which contains beam failure information of that set/pool of BFD RSs or that TRP of that SPCell.

In an embodiment, the MAC entity may for each pending SR not triggered according to the BSR procedure for a serving Cell:

if this SR was triggered by beam failure recovery of a set/pool of BFD RSs or a TRP of a serving cell (or SCell) and a MAC PDU is transmitted and this PDU includes a BFR MAC CE or a Truncated BFR MAC CE which contains beam failure recovery information of that set/pool of BFD RSs or that TRP of the serving cell (or SCell);

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 3A

In some embodiments, if beam failure detection indication is received for a set/pool of BFD RSs of SpCell, a configurable number of times within a timer interval or if beam failure is detected for a set/pool of BFD RSs of SpCell as explained earlier, the UE:

Trigger BFR for a set/pool of BFD RSs of SpCell

Trigger SR if UL grant is not available for transmitting BFR MAC CE or truncated BFR MAC CE or trigger SR if UL grant is available but cannot accommodate neither BFR MAC CE plus its header nor truncated BFR MAC CE plus its subheader. can accommodate (truncated) BFR MAC CE plus its header If UL grant is available and can accommodate (truncated) BFR MAC CE plus its header, Transmit BFR MAC CE in UL grant.

In an embodiment, SR trigger and generation and transmission of BFR MAC CE as explained above is performed, only if there is at least one serving cell for which BFR is triggered and not cancelled and evaluation of candidate beam in list of candidate beams corresponding to set(s)/pool(s) of BFD RSs for which beam failure is detected is completed.

The enhanced format of BFR MAC CE 800, 900 is shown in FIG. 8 and FIG. 9. BFR MAC CE is generated as follows:

If there is no RS (SSB/CSI RS) with RSRP above threshold amongst the candidate beam RSs for a set/pool of SCell for which beam failure is detected and recovery is initiated, indicate which set/pool has failed in BFR MAC CE. (AC=0, E=0, Set ID/Pool ID, R bits).

Else: include RS ID i.e., ID of an SSB/CSI RS with SS-RSRP/CSI-RSRP above a threshold amongst the candidate RSs of a set/pool of candidate RSs corresponding to a set/pool of BFD RSs of serving cell for which beam failure is detected. Set AC=1, E=0, Candidate RS ID. Candidate RS ID is index of entry in candidate RS list. If candidate beam RS list is different for different sets/pools, entries in multiple candidate beam RS lists can be sequentially indexed starting from first list. In an embodiment, set ID/Pool ID can also be included.

else if beam failure detection indication is received for SpCell a configurable number of times within a timer interval or if beam failure is detected for all sets/pools of BFD RSs of SpCell as explained earlier, the UE initiates beam failure recovery for SpCell:

Trigger random access on SpCell.

If there is at least one RS (SSB/CSI RS) with RSRP above threshold amongst the RSs in candidate beam RS list of SpCell, perform CFRA.

Else, the UE:

Performs CBRA.

Generates BFR MAC CE. BFR MAC CE is transmitted in MsgA or Msg3. The enhanced format of BFR MAC CE is shown in FIG. 8 and FIG. 9. BFR MAC CE is generated as follows:

BFR MAC CE includes bitmap wherein each bit corresponds to a serving cell. Set bit corresponding to SpCell to 1.

Add beam failure recovery information for each set/pool of SCell for which beam failure is detected (i.e., one AC octet for each set/pool of SCell for which beam failure is detected).

For beam failure recovery information of a set/pool of SCell for which beam failure is detected.

Set E to 1 or 0 to indicate whether beam failure recovery information of another set/pool of SCell for which beam failure is detected of same serving cell follows or not respectively If there is no RS (SSB/CSI RS) with RSRP above threshold amongst the candidate beam RSs for a set/pool of SCell for which beam failure is detected and recovery is initiated:

Set AC=0; Include Set ID/Pool ID, R bits.

Else:

Set AC=1; include Candidate RS ID i.e., ID of an SSB/CSI RS with SS-RSRP/CSI-RSRP above a threshold amongst the candidate RSs of a set/pool of candidate RSs corresponding to a set/pool of BFD RSs of serving cell for which beam failure is detected. Set AC=1, E=0, candidate RS ID. Candidate RS ID is index of entry in candidate RS list. If candidate beam RS list is different for different sets/pools, entries in multiple candidate beam RS lists can be sequentially indexed starting from first list. In an embodiment, set ID/Pool ID can also be included.

Note that in an embodiment, even in CFRA case BFR MAC CE can be generated and transmitted in MsgA or Msg3 to include BFR info of sets/pools of BFD RSs of serving cell for which beam failure is detected.

It is to be noted that beam failure recovery of a set/pool of BFD RSs or a TRP of a serving cell can also be referred as M-TRP BFR for the serving cell or partial BFR for the serving cell or enhanced BFR for the serving cell.

In an embodiment, for a BFR of TRP or set/pool of BFD RSs of SpCell, if a PDCCH addressed to C-RNTI indicating uplink grant for a new transmission is received for the HARQ process used for the transmission of the BFR MAC CE or truncated BFR MAC CE which contains beam failure recovery information for a set/pool of BFD RSs or a TRP of this serving cell, a UE sets BFI_COUNTER corresponding to the set/pool of BFD RSs or the TRP to zero and cancel all triggered BFRs for the set/pool of BFD RSs or TRP of this serving cell and consider BFR of TRP or set/pool of BFD RSs of SpCell successfully completed.

In an embodiment, all BFRs triggered for set/pool of BFD RSs or TRP of an SPCell may be cancelled when a MAC PDU is transmitted and this PDU includes a BFR MAC CE or truncated BFR MAC CE which contains beam failure information of that set/pool of BFD RSs or that TRP of that SPCell.

In an embodiment, the MAC entity may for each pending SR not triggered according to the BSR procedure for a Serving Cell:

if this SR was triggered by beam failure recovery of a set/pool of BFD RSs or a TRP of a serving cell (or SCell) and a MAC PDU is transmitted and this PDU includes a BFR MAC CE or a truncated BFR MAC CE which contains beam failure recovery information of that set/pool of BFD RSs or that TRP of the serving cell (or SCell).

It is to be noted that beam failure recovery of a set/pool of BFD RSs or a TRP of a serving cell can also be referred as M-TRP BFR for the serving cell or partial BFR for the serving cell or enhanced BFR for the serving cell.

Embodiment 4

If BFD criteria is met for one or more TRP(s) of SpCell (i.e., BFD is detected for one or more TRPs of SpCell as explained earlier), the UE initiates beam failure recovery for TRP(s) of SpCell:

Trigger random access on SpCell.

Transmit BFR MAC CE in Msg3 or MsgA. The enhanced format of BFR MAC CE 600, 700 is shown in FIG. 6 and FIG. 7. BFR MAC CE is generated as follows:

BFR MAC CE includes bitmap wherein each bit corresponds to a serving cell. Set bit corresponding to SpCell for which beam failure is detected to 1.

Add beam failure recovery information for each failed TRP (i.e., one AC octet for each failed TRP) of SpCell.

For beam failure recovery information of a TRP of SpCell:

Set E to 1 or 0 to indicate whether beam failure recovery information of another TRP of same serving cell follows or not respectively. Note that if beam failure recovery information of only one TRP is included in BFR MAC CE, E field may not be needed/included in BFR MAC CE.

If there is no RS (SSB/CSI RS) with RSRP above threshold amongst the candidate RSs of this TRP of serving cell for which beam failure is detected (and recovery is initiated):

Set AC=0; Include TRP ID, R bits. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs. Set n/pool n/list n of BFD RSs corresponds to set n/pool n/list n of candidate beam RSs Else:

Set AC=1; include Candidate RS ID i.e., ID of an SSB/CSI RS of the TRP with SS-RSRP/CSI-RSRP above a threshold.

In an embodiment, Candidate RS ID may BE index of entry in candidate RS list corresponding to an SSB/CSI RS of the TRP with SS-RSRP/CSI-RSRP above a threshold. TRP can be implicitly identified if list is common for all TRPs. If candidate beam RS list is different for different TRPs, entries in multiple candidate beam RS lists can be sequentially indexed starting from first entry in first list. In an embodiment, TRP ID may be also included. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs.

Embodiment 4A

In some embodiments, if BFD criteria is met for one or more sets/pools of BFD RSs of SpCell (i.e., beam failure is detected for one or more sets/pools of BFD RSs of SpCell as explained earlier), the UE initiates beam failure recovery the one or more sets/pools of BFD RSs of SpCell:

Triggers random access on SpCell.

Transmits BFR MAC CE in Msg3 or MsgA. For example, the enhanced format of BFR MAC CE 800, 900 is shown in FIG. 8 and FIG. 9. BFR MAC CE may be generated by the UE as follows:

BFR MAC CE may include bitmap wherein each bit corresponds to a serving cell. Set bit corresponding to SpCell for which beam failure is detected to 1.

Add beam failure recovery information for each set/pool of BFD RSs for which beam failure is detected (i.e., one AC octet for each set/pool of BFD RSs).

For beam failure recovery information of a set/pool of BFD RSs:

Sets E to 1 or 0 to indicate whether beam failure recovery information of another set/pool of BFD RSs of same serving cell follows or not respectively. Note that if beam failure recovery information of only one TRP or set/pool of BFD RSs is included in BFR MAC CE, E field may not be needed/included in BFR MAC CE.

If there is no RS (SSB/CSI RS) with RSRP above threshold amongst the candidate RSs of a set/pool of candidate RSs corresponding to a set/pool of BFD RSs of serving cell for which beam failure is detected:

Set AC=0; Include Set/pool ID, R bits.

Else:

Set AC=1; include Candidate RS ID i.e., ID of an SSB/CSI RS with SS-RSRP/CSI-RSRP above a threshold amongst the candidate RSs of a set/pool of candidate RSs corresponding to a set/pool of BFD RSs of serving cell for which beam failure is detected In an embodiment, Candidate RS ID may be index of entry in candidate RS list corresponding to an SSB/CSI RS. If there are multiple candidate beam RS lists entries in multiple candidate beam RS lists can be sequentially indexed starting from first entry in first list. In an embodiment, set/pool ID may be also included.

Method 2:

Beam failure detection and beam failure recovery trigger for a serving cell:

For beam failure detection in a serving cell, a UE may receive beam failure detection configuration for that serving cell from a gNB as explained earlier. The UE may determine whether the received beam failure detection configuration includes beam failure detections RSs for multiple TRPs or not.

If the beam failure detection configuration includes beam failure detection RSs for multiple TRPs (or in other words multiple sets/pools/groups of beam failure detection RSs are received), a UE detects beam failure and trigger beam failure recovery for a serving cell as follows:

1. The UE (PHY) measures beam failure detection RSs of TRPs (or measures beam failure detection RSs of all sets/pools/groups of beam failure detection RSs) of the serving cell in beam failure detection configuration periodically.

2. If all BFD RSs of any TRP of the serving cell are below threshold or hypothetical PDCCH BLER determined based on measurement of beam failure detection RS is above a threshold for all beam failure detection RSs of any TRP:

Beam failure instance is considered occurred i.e., PHY layer transmit a beam failure instance indication to MAC layer.

In other words, if all BFD RSs in any set/pool/group of BFD RSs of the serving cell are below threshold or hypothetical PDCCH BLER determined based on measurement of beam failure detection RS is above a threshold for all beam failure detection RSs in any set/pool/group of BFD RSs of the serving cell:

Beam failure instance is considered occurred i.e., PHY layer transmit a beam failure instance indication to MAC layer.

3. Upon receiving the beam failure instance indication from PHY layer for a serving cell, start or restart the beamFailureDetectionTimer of serving cell.

update the BFI_COUNTER of serving cell.

Note that only one timer and counter is maintained per serving cell irrespective of number of TRPs in a serving cell.

4. if BFI_COUNTER>=beamFailureInstanceMaxCount of the serving cell: Beam failure is considered detected for the serving cell and beam failure recovery for the serving cell is initiated If beam failure detection configuration does not include beam failure detection RSs for multiple TRPs, a UE detects beam failure and trigger beam failure recovery as follows:

1. A UE (PHY) measures beam failure detection RSs of the serving cell in beam failure detection configuration periodically.

2. If all BFD RSs of the serving cell are below threshold or hypothetical PDCCH BLER determined based on measurement of beam failure detection RS is above a threshold for all beam failure detection RSs of the serving cell:

Beam failure instance is considered occurred i.e., PHY layer transmit a beam failure instance indication to MAC layer.

3. Upon receiving beam failure instance indication from PHY layer for a serving cell, start or restart the beamFailureDetectionTimer of serving cell for which beam failure instance indication is received from PHY layer. One beamFailureDetectionTimer is maintained for the serving cell.

update the BFI_COUNTER of serving cell for which beam failure instance indication is received from PHY. One BFI_COUNTER is maintained for the serving cell.

4. if BFI_COUNTER>=beamFailureInstanceMaxCount for the serving cell: Beam failure may be considered detected for the serving cell and beam failure recovery for the serving cell may be initiated.

Beam failure recovery procedure for a serving cell supporting multiple TRPs:

If BFD criteria is met for serving cell (as explained above),

If serving cell is SCell, the UE:

Trigger SCell BFR.

if UL-SCH resources are available for a new transmission and if the UL-SCH resources can accommodate the BFR MAC CE plus its subheader as a result of LCP: the UE generates the BFR MAC CE and transmit the MAC PDU including BFR MAC CE to the gNB.

else if UL-SCH resources are available for a new transmission and if the UL-SCH resources can accommodate the truncated BFR MAC CE plus its subheader as a result of LCP: the UE generates the truncated BFR MAC CE and the UE transmits the MAC PDU including truncated BFR MAC CE to the gNB.

else: the UE triggers the SR for SCell beam failure recovery for SCell.

Else, the UE:

Triggers random access procedure on SpCell.

generates the (truncated-) BFR MAC CE and transmit the MAC PDU including BFR MAC CE to a gNB in MsgA or Msg3 during the random access procedure.

In an embodiment, the enhanced format of BFR MAC CE is shown in FIG. 6 and FIG. 7. (truncated-) BFR MAC CE is generated as follows:

(truncated-) BFR MAC CE may include bitmap wherein each bit corresponds to a serving cell. Set bit corresponding to Serving cell for which beam failure is detected to 1.

Add beam failure recovery information for each failed TRP (i.e., one AC octet for each failed TRP) of serving cell OR Add beam failure recovery information according to each set/pool/list of candidate beam RSs.

For beam failure recovery information of a set/pool/list of candidate beam RSs or TRP Set E to 1 or 0 to indicate whether another beam failure recovery information of same serving cell follows or not respectively If there is no RS (SSB/CSI RS) with RSRP above threshold amongst the candidate RSs of this TRP of serving cell for which beam failure is detected (and recovery is initiated):

Set AC=0; Include TRP ID, R bits. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to set 0/pool 0/list 0 of candidate beam RSs, set 1/pool 1/list 1 of BFD RSs corresponds to set 1/pool 1/list 1 of candidate beam RSs.

Else:

Set AC=1; include Candidate RS ID i.e., ID of an SSB/CSI RS of the TRP with SS-RSRP/CSI-RSRP above a threshold.

In an embodiment, Candidate RS ID may be index of entry in candidate RS list corresponding to an SSB/CSI RS of the TRP with SS-RSRP/CSI-RSRP above a threshold. TRP can be implicitly identified if list is common for all TRPs. If candidate beam RS list is different for different TRPs, entries in multiple candidate beam RS lists can be sequentially indexed starting from first list. In an embodiment, TRP ID may be also included. Note that in case TRP ID is not explicitly included in beam failure detection and recovery configuration, set ID or pool ID or list ID corresponding to different sets of BFD RSs and candidate beam RSs is included. Set 0/pool 0/list 0 of BFD RSs corresponds to Set 0/pool 0/list 0 of candidate beam RSs, set 1/pool 1/list 1 of BFD RSs corresponds to set 1/pool 1/list 1 of candidate beam RSs.

In an embodiment, (truncated-) BFR MAC CE may be generated as follows:

(truncated-) BFR MAC CE includes bitmap wherein each bit corresponds to a serving cell. Set bit corresponding to serving cell for which beam failure is detected to 1.

Add beam failure recovery information for each TRP (i.e., one AC octet for each TRP) of serving cell irrespective of failed or not. OR Add beam failure recovery information according to each set/pool/list of candidate beam RSs. beam failure recovery information may be added in ascending order of TRP ID/Set ID/pool ID/List ID, etc.

For beam failure recovery information of a set/pool/list of candidate beam RSs or TRP If there is no RS (SSB/CSI RS) with RSRP above threshold amongst the candidate RSs of this TRP of serving cell for which beam failure is detected (and recovery is initiated):

Set AC=0; Include R bits.

(Alternate) Set AC=0; F=0/1 to indicate whether there is failure or not; R bits.

Else:

Set AC=1; include Candidate RS ID i.e., ID of an SSB/CSI RS of the TRP or ID of an SSB/CSI RS in a set/pool/list of candidate beam RSs, with SS-RSRP/CSI-RSRP above a threshold.

In an embodiment, candidate RS ID may be index of entry in candidate RS list corresponding to an SSB/CSI RS with SS-RSRP/CSI-RSRP above a threshold.

The bitmap fields in the (truncated-) BFR MAC CEs are defined as follows:

SP: This field indicates beam failure detection for the SpCell of this MAC entity. The SP field is set to 1 to indicate that beam failure is detected for SpCell. Otherwise, it is set to 0;

$C_i$ (BFR MAC CE): This field indicates beam failure detection and the presence of octet(s) containing the AC field for the SCell with ServCellIndex i. The $C_i$ field set to 1 indicates that beam failure is detected and octet(s) containing the AC field is present for the SCell with ServCellIndex i. The $C_i$ field set to 0 indicates that the beam failure is not detected and octet(s) containing the AC field is not present for the SCell with ServCellIndex i. The octets containing the AC field are present in ascending order based on the ServCellIndex;

$C_i$ (Truncated BFR MAC CE): This field indicates beam failure detection for the SCell with ServCellIndex i. The $C_i$ field set to 1 indicates that beam failure is detected and octet(s) containing the AC field for the SCell with ServCellIndex i may be present. The $C_i$ field set to 0 indicates that the beam failure is not detected and the octet(s) containing the AC field is not present for the SCell with ServCellIndex i. The octets containing the AC field, if present, are included in ascending order based on the ServCellIndex. The number of octets containing the AC field included is maximized, while not exceeding the available grant size;

In an embodiment, (truncated-) BFR MAC CE can be generated as explained in method 1.

Method

In an exemplary embodiment (Option 1), for beam failure detection configuration:

BFD RS list may be signaled per BWP. In case of multiple TRPs, one bit TRP indicator may be included to indicate whether RS is for TRP 0 or TRP 1.

In an exemplary embodiment, for beam failure detection trigger for a serving cell:
  If multiple TRPs are configured in a serving cell, beam failure is considered detected when all RSs of a TRP in BFD RS list of the serving cell are below threshold.
  Else, beam failure is considered detected when all RSs in BFD RS list of the serving cell are below threshold.

In an exemplary embodiment, for beam failure recovery for SpCell:
  Candidate beam RS list is signaled per BWP. In case of multiple TRPs, one bit TRP indicator can be included to indicate whether RS is for TRP0 or TRP 1.
  If multiple TRPs are configured:
    if beam failure detection indication is received for a TRP of SpCell, a configurable number of times within a timer interval: trigger RA.
    If there is at least one RS (SSB/CSI RS) with RSRP above threshold amongst the RSs associated with TRP for which beam failure recovery is initiated in candidate beam RS list of SpCell, perform CFRA.
    Else, the UE:
      Performs CBRA;
      Generates BFR MAC CE; and
      Indicates which TRP of SpCell has failed in BFR MAC CE
  else, the UE:
    if beam failure detection indication is received for SpCell a configurable number of times within a timer interval: trigger RA.
    If there is at least one RS (SSB/CSI RS) with RSRP above threshold amongst the RSs in candidate beam RS list of SpCell, perform CFRA.
    Else, the UE:
      Performs CBRA; and
      Generates BFR MAC CE.

In an exemplary embodiment, for beam failure recovery for SCell:
  Candidate beam RS list is signaled per BWP. In case of multiple TRPs, one bit TRP indicator can be included to indicate whether RS is for TRP0 or TRP 1.
  If multiple TRPs are configured:
    If beam failure detection indication is received for TRP of SCell, a configurable number of times within a timer interval, SCell BFR is triggered.
    the UE may trigger SR if UL grant is not available.
    the UE may transmit BFR MAC CE in UL grant.
      In an exemplary embodiment, Single AC octet per SCell may be used.
        If there is no RS (SSB/CSI RS) with RSRP above threshold amongst the RSs of the TRP of SCell for which beam failure recovery is initiated, indicate which TRP has failed in BFR MAC CE. If there is at least one RS (SSB/CSI RS) with RSRP above threshold amongst the RSs of the TRP of SCell for which beam failure recovery is initiated, include RS ID in BFR MAC CE.
      in another exemplary embodiment, AC octet per TRP per SCell may be used. For example, 1st Octet may be used for TRP 0 and 2nd Octet may be used for TRP1.
        If TRP is not failed: AC=0, F=0, 6 R bits
        If TRP is failed and no candidate beam available: AC=0, F=1, 6 Rbits.
        If TRP is failed and candidate beam available: AC=1, RS ID.
    else, the UE may:
      Triggers SR if UL grant is not available; and
      Transmits BFR MAC CE in UL grant.
      Single AC octet per SCell.
        If no candidate beam available: AC=0, Reserved bits.
        If candidate beam available, AC=1, RS ID.

In an exemplary embodiment (Option 2), for Beam failure detection Configuration:
  BFD RS list may be signaled separately for each TRP per BWP.
  In an embodiment, the two list of groups in UL BWP configuration may be used instead of 1 bit indicator (e.g., group1 may include Candidate beam RS list which are associated with TRP1, and group2 may include Candidate beam RS list which are associated with TRP2). Beam failure detection is triggered for a serving cell.
  If multiple TRPs are configured in a serving cell:
    Beam failure may be considered detected when all RSs in BFD RS list of a TRP of the serving cell are below threshold.
  Else
    Beam failure may be considered detected when all RSs in BFD RS list of the serving cell are below threshold.

In an exemplary embodiment, for Beam failure recovery for SpCell:
  Candidate beam RS list may be signaled separately for each TRP per BWP.
  If multiple TRPs are configured:
    if beam failure detection indication is received for a TRP of SpCell, a configurable number of times within a timer interval: the UE may trigger RA.
    If there is at least one RS (SSB/CSI RS) with RSRP above threshold amongst the RSs in candidate beam RS list of TRP of SpCell for which beam failure recovery is initiated, the UE may perform CFRA.
    Else, the UE may:
      Perform CBRA;
      Generate BFR MAC CE; and
      Indicate which TRP of SpCell has failed in BFR MAC CE
  else
    if beam failure detection indication is received for SpCell a configurable number of times within a timer interval: the UE may trigger RA.
    If there is at least one RS (SSB/CSI RS) with RSRP above threshold amongst the RSs in candidate beam RS list of SpCell, the UE may perform CFRA.
    Else, the UE may:
      Perform CBRA; and
      Generate BFR MAC CE.

In an exemplary embodiment, for beam failure recovery for SCell:
  Candidate beam RS list may be signaled separately for each TRP per BWP.
  If multiple TRPs are configured:
    If beam failure detection indication is received for TRP of SCell, a configurable number of times within a timer interval, SCell BFR is triggered.
    Trigger SR if UL grant is not available; and
    Transmit BFR MAC CE in UL grant.
      AC octet per TRP per SCell. For example, 1st Octet is for TRP 0 and 2nd Octet for TRP1.
        If TRP is not failed: AC=0, F=0, 6 R bits.
        If TRP is failed and no candidate beam available: AC=0, F=1, 6 Rbits.
        If TRP is failed and candidate beam available: AC=1, RS ID.

else, the UE may:
Trigger SR if UL grant is not available; and
Transmit BFR MAC CE in UL grant.
Single AC octet per SCell.
If no candidate beam available: AC=0, reserved bits.
If candidate beam available, AC=1, RS ID.
Other BFR Enhancements.

Upon detection of beam failure for SCell, BFR may be triggered. Upon triggering BFR, the UE may transmit BFR MAC CE in earliest available UL grant which can accommodate BFR MAC CE according to LCP. It is possible that the UE has not yet measured the candidate beam RSs in the candidate beam RS list by the time of availability of such UL grant. As a result, the UE may transmit BFR MAC CE with AC=0 and a network may deactivate the SCell based on this. This is not efficient.

In an exemplary embodiment (Option 1), The MAC entity (i.e., the mac entity included in the UE) may:
1> if the beam failure recovery procedure determines that at least one BFR has been triggered and not cancelled; and
1> if the UE has measured and evaluated candidate beams in candidateBeamRSSCellList; (or if UE has determined the availability of a candidate beam in candidateBeamRSSCellList for the beam failure recovery):
2> if UL-SCH resources are available for a new transmission and if the UL-SCH resources can accommodate the (truncated) BFR MAC CE plus its subheader as a result of LCP:
3> instruct the Multiplexing and Assembly procedure to generate the BFR MAC CE.
2> else if UL-SCH resources are available for a new transmission and if the UL-SCH resources can accommodate the truncated BFR MAC CE plus its subheader as a result of LCP:
3> instruct the Multiplexing and Assembly procedure to generate the truncated BFR MAC CE.
2> else:
3> trigger the SR for SCell beam failure recovery for each SCell for which BFR has been triggered and not cancelled.

In an exemplary embodiment (Option 2), The MAC entity may:
1> if the Beam Failure Recovery procedure determines that at least one BFR has been triggered and not cancelled; and
1> if the UE has measured and evaluated candidate beams in candidateBeamRSSCellList of at least one SCell for which BFR has been triggered and non-cancelled; (or if the UE has determined the availability of a candidate beam in candidateBeamRSSCellList for the beam failure recovery):
2> if UL-SCH resources are available for a new transmission and if the UL-SCH resources can accommodate the BFR MAC CE plus its subheader as a result of LCP:
3> instruct the Multiplexing and Assembly procedure to generate the BFR MAC CE.
3> in the BFR MAC CE, the UE sets the $C_i$ bit to 1 for an SCell with servingCellIndex i if beam failure is detected for that SCell; and the UE has measured/evaluated candidate beams in candidateBeamRSSCellList of that SCell (or if the UE has determined the availability of a candidate beam in candidateBeamRSSCellList for the beam failure recovery of that SCell):
2> else if UL-SCH resources are available for a new transmission and if the UL-SCH resources can accommodate the truncated BFR MAC CE plus its subheader as a result of LCP:
3> instruct the Multiplexing and Assembly procedure to generate the truncated BFR MAC CE.
2> else:
3> trigger the SR for SCell beam failure recovery for each SCell for which BFR has been triggered and not cancelled.

As per the above operation, if there are multiple SCells (example SCell 1 and SCell 2) for which BFR is triggered and is not yet cancelled:
if evaluation of candidate beams for SCell 1 is completed but evaluation of candidate beams for SCell 2 is not completed, (truncated) BFR MAC CE is generated if available UL grant can accommodate (truncated) BFR MAC CE plus its subheader. In this case in the MAC CE, $C_i$ bit corresponding to SCell 2 is set to 0 even though the beam failure is detected for SCell 2; $C_i$ bit corresponding to SCell 1 is set to 1 as the beam failure is detected for SCell 1 and evaluation of candidate beams is also completed.
if evaluation of candidate beams for SCell 2 is completed but evaluation of candidate beams for SCell 1 is not completed, (truncated) BFR MAC CE is generated if available UL grant can accommodate truncated) BFR MAC CE plus its subheader. In this case in the MAC CE, $C_i$ bit corresponding to SCell 1 is set to 0 even though the beam failure is detected for SCell 1; $C_i$ bit corresponding to SCell 2 is set to 1 as the beam failure is detected for SCell 2 and evaluation of candidate beams is also completed.
if evaluation of candidate beams for SCell 1 is not completed and valuation of candidate beams for SCell 2 is not completed, (truncated) BFR MAC CE is not generated.

As per the above operation, if there is only SCell (example SCell 1) for which BFR is triggered and is not yet cancelled:
if evaluation of candidate beams for SCell 1 is completed, BFR MAC CE is generated if available UL grant can accommodate truncated) BFR MAC CE plus its subheader.
if evaluation of candidate beams for SCell 1 is not completed (truncated) BFR MAC CE is not generated.

In an exemplary embodiment (Option 3), The MAC entity may for each Serving Cell configured for beam failure detection:
1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> if the Serving Cell is SCell:
4> trigger a BFR for this Serving Cell upon determining the availability of a candidate beam in candidateBeamRSSCellList for the beam failure recovery;
3> else:
4> initiate a Random Access procedure on the SpCell upon determining the availability of a candidate beam in candidateBeamRSList for the beam failure recovery.

CG Type 1 Configuration & UL TX beams

Figure 14:
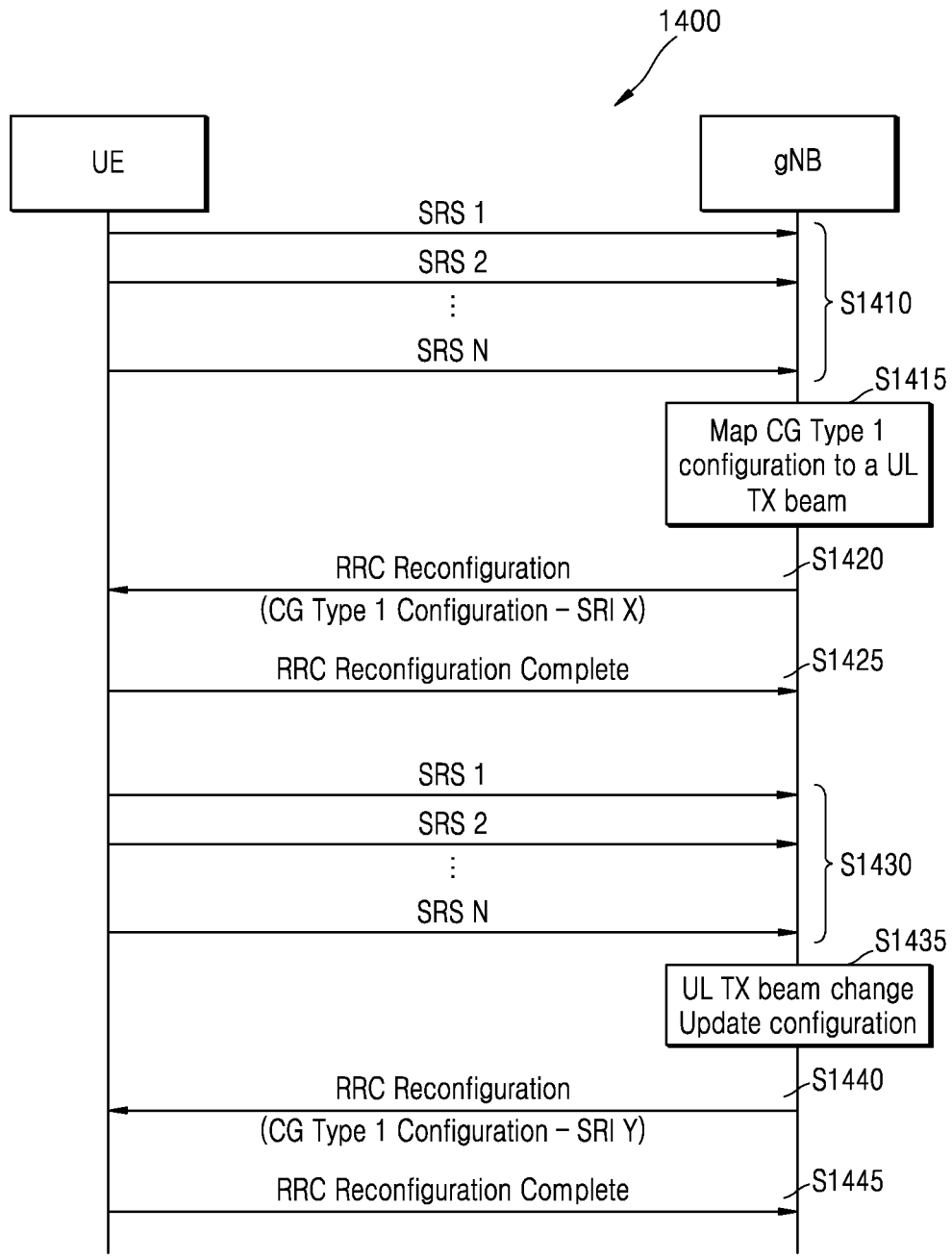
FIG. 14 illustrates a data transmission/reception method between a terminal and a base station for uplink beam transmission according to embodiments of the present disclosure.

FIG. 14 illustrates a data transmission/reception method between a terminal and a base station for uplink beam transmission according to embodiments of the present disclosure.

For PUSCH transmission UL TX beam information may be indicated by a gNB.

At step S1410, a UE may transmit SRS using various UL TX beams. SRS resources for transmitting the SRS using various UL TX beams may be signaled to a UE by a gNB. These resources are identified using SRS resource identifier (SRI).

At step S1415, a gNB may map CG type 1 configuration to a UL TX beam. At step S1420, the gNB may indicate the selected UL TX beam using SRI (for example, SRI X). For example, SRI may be indicated in DCI for dynamic grant and CG type 2. For example, SRI may be indicated in configuration of CG type 1 (referring to FIG. 14).

At step S1425, the UE may transmit RRC reconfiguration complete message to the gNB the selected UL TX beam using SRI.

At step S1430, the UE may transmit SRS using various UL TX beams. At step S1435, in case that UL TX beam is changed, the gNB may update configuration. For example, the gNB may map CG type 1 configuration to changed UL TX beam. At step S1440, the gNB may indicate the selected UL TX beam using SRI (for example, SRI Y), if UL TX beam is changed.

The issue is that every time the UL TX beam is changed, reconfiguration procedure is needed. The following FIG. 15 to FIG. 18 are diagrams for explaining an embodiment of a method for transmitting a UL TX beam related to the above-mentioned issue.

Figure 15:
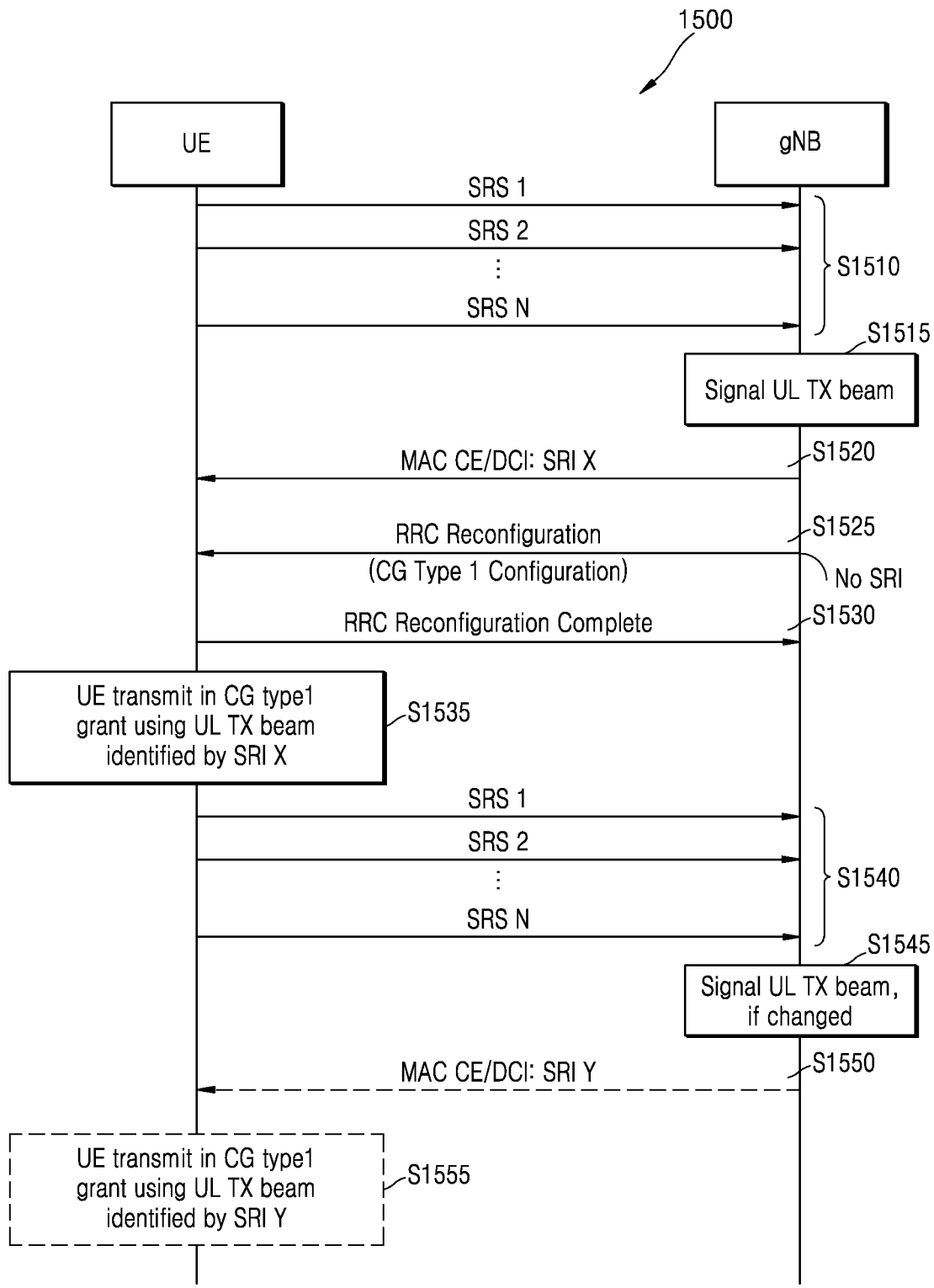
FIG. 15 illustrates a data transmission/reception method between a terminal and a base station for uplink beam transmission according to embodiments of the present disclosure.

Method 1:

FIG. 15 illustrates a data transmission/reception method between a terminal and a base station for uplink beam transmission according to embodiments of the present disclosure.

In one method of this disclosure (as shown in FIG. 15), a UE may receive the SRS configuration from a gNB. At step S1510, the UE may transmit SRS using various UL TX beams in the configured SRS resources. At step S1515, the gNB may select an UL TX beam. At step S1520, the gNB may indicate the SRS resource identifier (SRI) of SRS resource which was used by the UE to transmit SRS using that UL TX beam. The gNB may indicate/activate an SRI using MAC CE or DCI to the UE (for example, SRI X). If SRI is received using MAC CE, the UE may transmit a confirmation MAC CE to gNB. For subsequent CG type 1 grants, the UE may determine the UL TX beam based on this received SRI.

At step S1525, the gNB may configure configured grant type 1 using RRC reconfigurations message. Also, at step S1530, the UE may transmit RRC reconfiguration complete message to the gNB.

For UL transmission in these configured grants, at step S1535, the UE may use the UL TX beam which the UE has used for transmission in SRS resource identified by SRI, wherein SRI is indicated/activates by the gNB using MAC CE or DCI.

At step S1540, the UE may transmit SRS using various UL TX beams. At step S1545, the gNB may identify an UL TX beam, if UR TX beams are changed. At step S1550, the gNB may indicate the changed SRI of SRS resource which was used by the UE to transmit SRS using that UL TX beam (for example, SRI Y). If SRI is changed, at step S1555, the UE may apply the latest received SRI in MAC CE or DCI. For CG type 1 UL transmission, the UE calculates the PL based on the SRI which is indicated by the MAC CE/DCI. Note that for CG type 2 UL grants and dynamic UL grant, TCI state or SRI to determine the UL TX beam and pathloss (PL) is indicated in DCI scheduling those UL grants.

Figure 16:
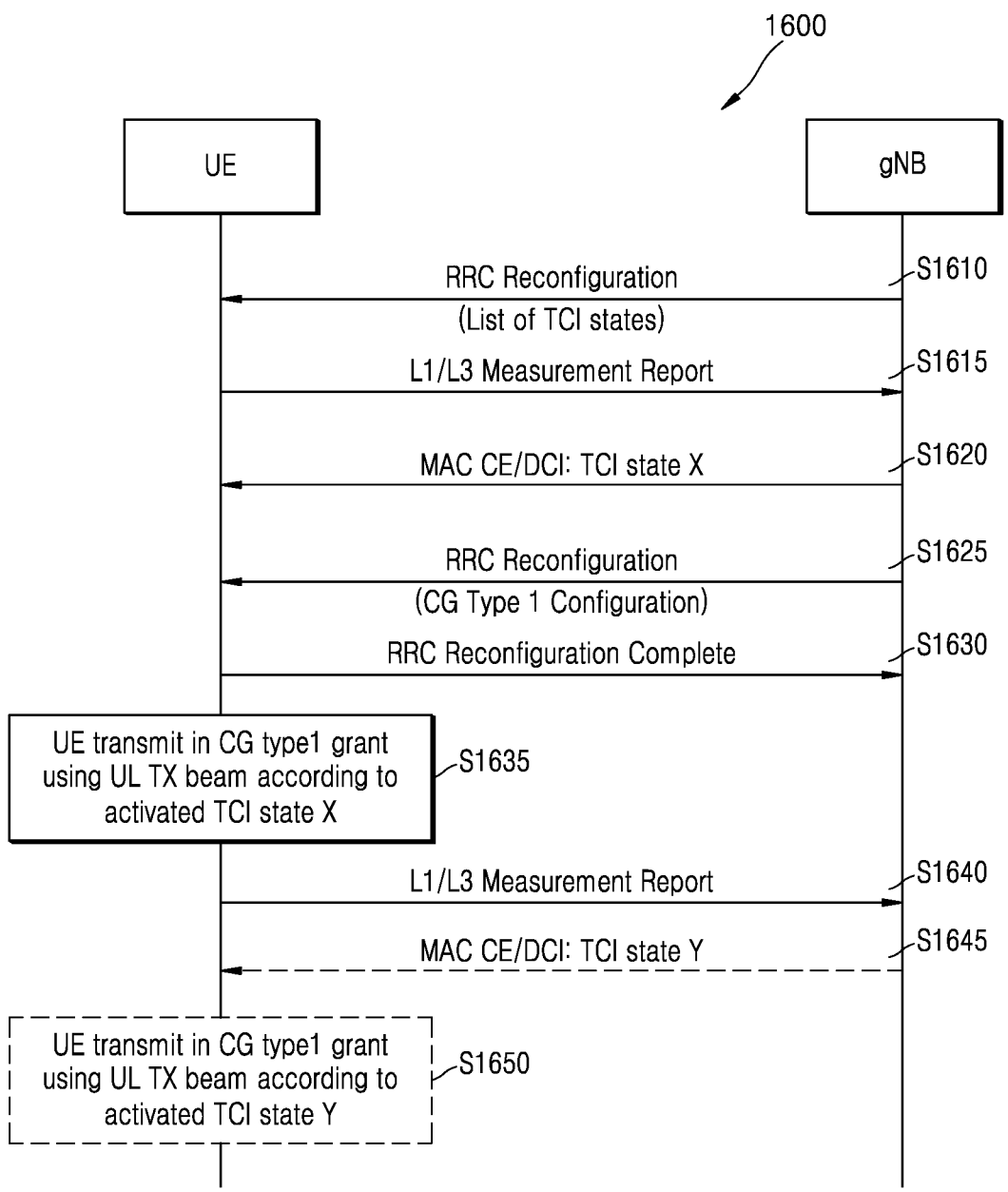
FIG. 16 illustrates a data transmission/reception method between a terminal and a base station for uplink beam transmission according to embodiments of the present disclosure.

FIG. 16 illustrates a data transmission/reception method between a terminal and a base station for uplink beam transmission according to embodiments of the present disclosure.

In an alternate embodiment (FIG. 16), instead of using SRS transmissions to determine the UL TX beam, a gNB may indicate (indication can be in RRC message) a UE to use the activated TCI state for determining the UL TX beam instead of SRI.

At step S1610, the gNB may transmit a RRC message (for example, RRC Reconfiguration message) including list of TCI states to UE. TCI state may indicate one of SSB/CSI RS. The UE may use the UL TX beam QCLed with the RX beam used to receive the SSB/CSI RS of the activated TCI state. For UL transmission, the UE calculates the PL based on the activated TCI state.

At step S1615, the UE may transmit L1/L3 measurement report to the gNB. At step S1620, the gNB may transmit MAC CE or DCI including TCI state based on received L1/L3 measurement report (for example, TCI state X).

At step S1625, the gNB may configures configured grant type 1 using RRC Reconfigurations message. For UL transmission, the gNB may indicate the UE to use the activated TCI state for determining the UL TX beam. TCI state may indicate one of SSB/CSI RS. For the UL transmission in this configured grant of CG type 1, at step S1635, the UE may use the UL TX beam QCLed with the RX beam used to receive the SSB/CSI RS of the activated TCI state. For UL transmission in these CG type grants, the UE may calculate the PL based on the activated TCI state. For another example, for CG type 2 UL grants and dynamic UL grant, TCI state or SRI to determine the UL TX beam may be indicated in DCI scheduling those UL grants.

For UL transmission, if indication to use the activated TCI state for determining the UL TX beam is not received from a gNB, a UE may determine the UL TX beam and pathloss using SRI as explained above.

At step S1640, the UE may transmit L1/L3 measurement report to gNB. At step S1645, in case that TCI state is changed, the gNB may transmit MAC CE or DCI including TCI state based on received L1/L3 measurement report (for example, TCI state Y) (optional step). At step S1650, the UE may transmit in CG type 1 grant using UL TX beam according to the activated TCI state. Referring to FIG. 16, in case that the TCI state is changed to TCI state Y from TCI state X, the UE may transmit in CG type 1 grant using UL TX beam according to the activated TCI state Y.

Figure 17:
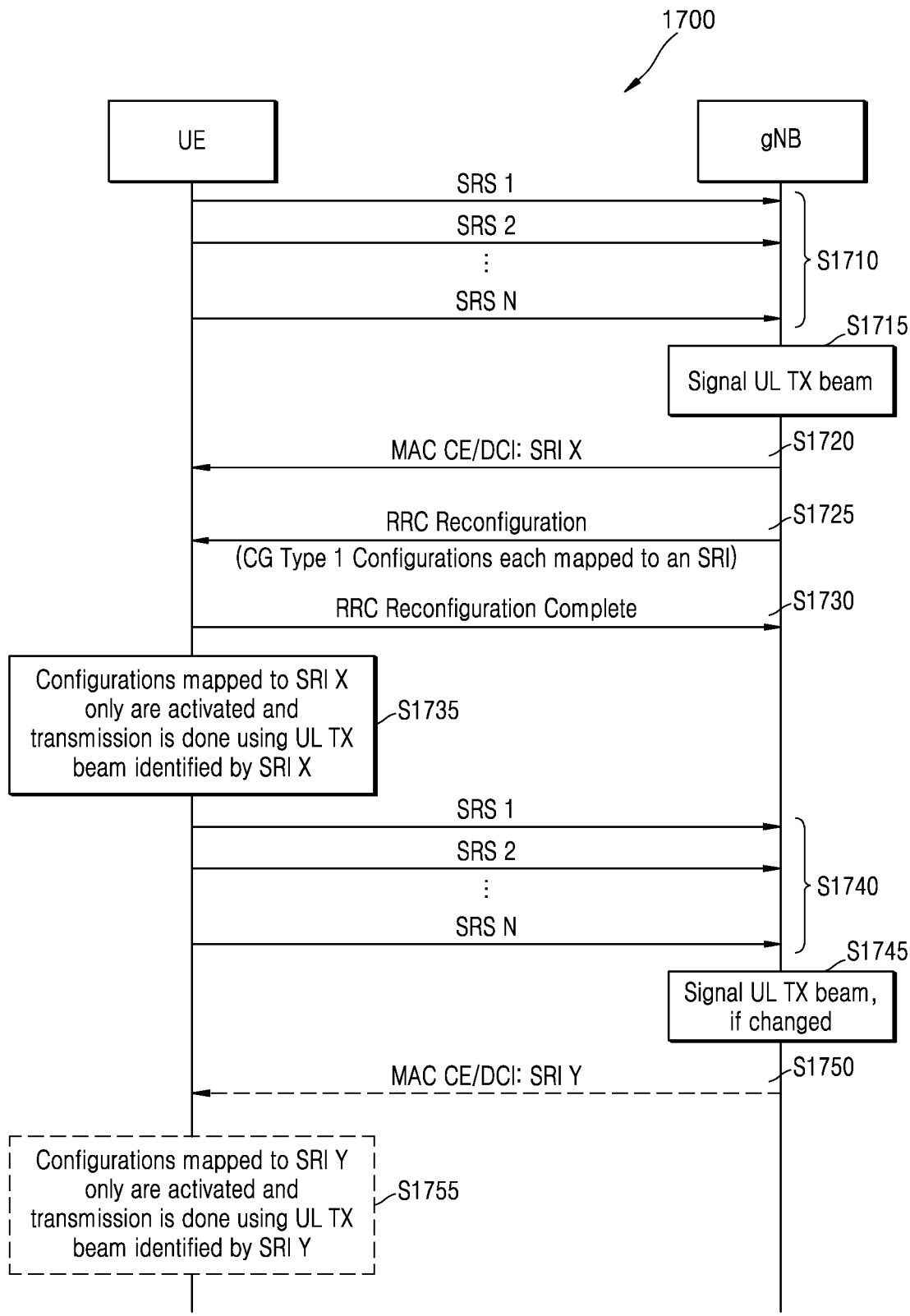
FIG. 17 illustrates a data transmission/reception method between a terminal and a base station for uplink beam transmission according to embodiments of the present disclosure.

Method 2:

FIG. 17 illustrates a data transmission/reception method between a terminal and a base station for uplink beam transmission according to embodiments of the present disclosure.

In another method of this disclosure (as shown in FIG. 17), the UE may receive the SRS configuration from the gNB. At step S1710, the UE may transmit SRS using various UL TX beams in the configured SRS resources. At step S1715, the gNB may select an UL TX beam. At step S1720, the gNB may indicate the SRS resource identifier (SRI) of SRS resource which was used by the UE to transmit SRS using that UL TX beam. For example, the gNB may indicate/activate an SRI using MAC CE or DCI to the UE (for example, SRI X). If the SRI is received using MAC CE, the UE may transmit a confirmation MAC CE to the gNB. For subsequent CG type 1 grants, the UE may determine the UL TX beam based on this received SRI.

At step S1725, the gNB may configure configured grant type 1 using a RRC Reconfigurations message. The gNB may configure one or more CG type 1 configurations. Each configuration may be mapped to one or more SRIs. The SRI(s) associated with each CG type configuration may be signaled by the gNB.

At step S1730, the UE may transmit RRC reconfiguration complete message to the gNB.

At step S1735, the UE may perform UL transmission in CG type 1 grants of configuration(s) associated with an activated SRI (i.e., SRI received in MAC CE or DCI activating an SRI) (for example, SRI X). For UL transmission in these configured grants, the UE may use the UL TX beam which the UE has used for transmission in SRS resource identified by SRI, wherein SRI is indicated/activates by the gNB using MAC CE or DCI.

At step S1740, the UE may transmit SRS using various UL TX beams. At step S1745, the gNB may identify an UL TX beam based on received UL TX beams, if UL TX beams are changed. At step S1750, the gNB may indicate the changed SRI of SRS resource which was used by the UE to transmit SRS using that UL TX beam (for example, SRI Y). If SRI is changed, at step S1755, the UE may apply the latest received SRI in MAC CE or DCI to determine the CG type 1 configuration (s) or CG type 1 grants to use and also to determine the PL.

For another example, for CG type 2 UL grants and dynamic UL grant, TCI state or SRI to determine the UL TX beam and PL may be indicated in DCI scheduling those UL grants.

Figure 18:
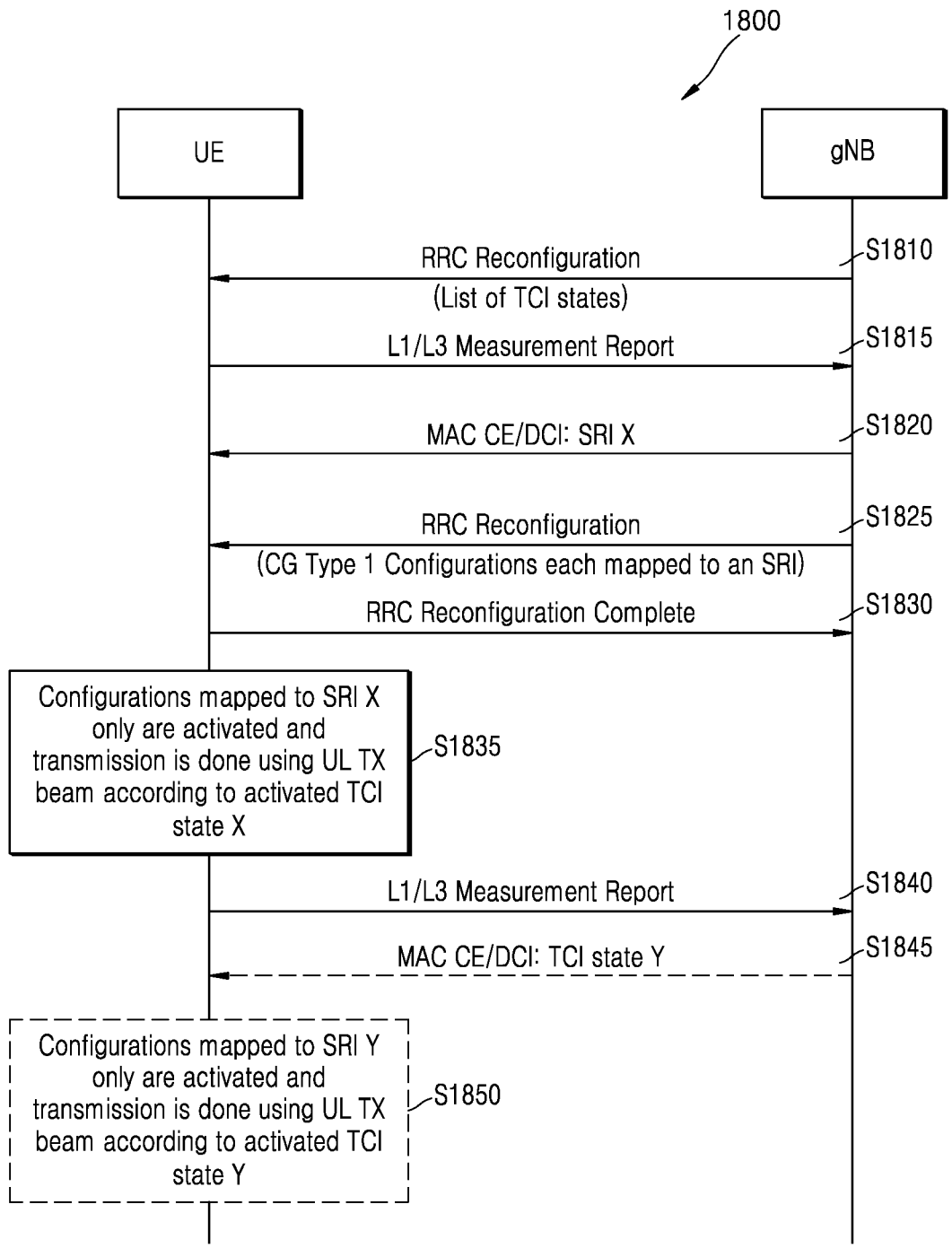
FIG. 18 illustrates a data transmission/reception method between a terminal and a base station for uplink beam transmission according to embodiments of the present disclosure.

FIG. 18 illustrates a data transmission/reception method between a terminal and a base station for uplink beam transmission according to embodiments of the present disclosure.

In an alternate embodiment (FIG. 18), instead of using SRS transmissions to determine the UL TX beam, a gNB may indicate (for example, indication may be in RRC message) a UE to use the activated TCI state for determining the UL TX beam instead of SRI. TCI state may indicate one of SSB/CSI RS. The UE may use the UL TX beam QCLed with the RX beam used to receive the SSB/CSI RS of the activated TCI state.

At step S1810, the gNB may transmit a RRC message (for example, RRC reconfiguration message) including list of TCI states to the UE. At step S1815, the UE may transmit L1/L3 measurement report to the gNB. At step S1820, the gNB may transmit MAC CE or DCI including SRI based on received L1/L3 measurement report (for example, SRI X).

At step S1825, the gNB may configure configured grant type 1 using RRC Reconfigurations message. The gNB may configure one or more CG type 1 configurations. Each configuration may be mapped to one or more TCI states. The TCI states associated with each CG type configuration may be signaled by the gNB. For UL transmission, the gNB may indicate the UE to use the activated TCI state for determining the UL TX beam. TCI state may indicate one of SSB/CSI RS. At step S1835, the UE performs UL transmission in CG type grants of configuration(s) associated with an activated TCI state. For the UL transmission in this configured grant of CG type 1, the UE uses the UL TX beam QCLed with the RX beam used to receive the SSB/CSI RS of the activated TCI state. For UL transmission in this configured grant of CG type 1, the UE calculates the PL based on the activated TCI state. For another example, for CG type 2 UL grants and dynamic UL grant, TCI state or SRI to determine the UL TX beam and PL is indicated in DCI scheduling those UL grants.

Figure 19:
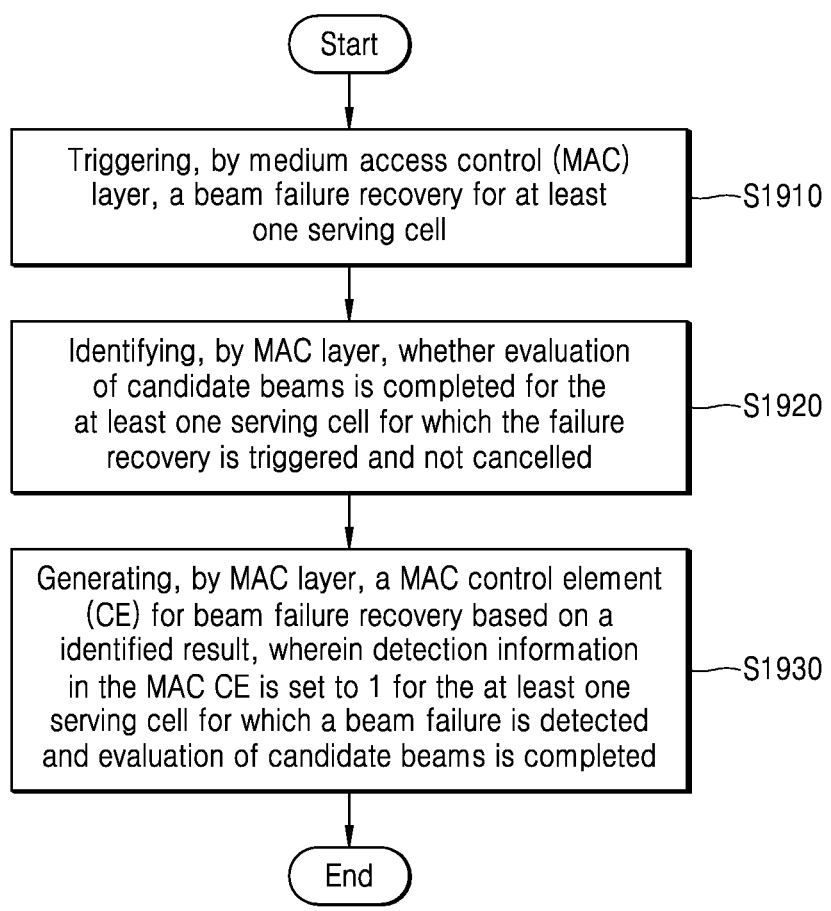
FIG. 19 illustrates a flowchart illustrating a method performed by a user equipment (UE) in a wireless communication system according to embodiments of the present disclosure.

FIG. 19 illustrates a flowchart illustrating a method performed by a user equipment (UE) in a wireless communication system according to embodiments of the present disclosure.

In some embodiments, the UE may receive, from a base station (BS), a radio resource control (RRC) message including a beam failure detection configuration. For example, the beam failure detection configuration may include a list of beam failure detection reference signals, and a TRP indicator in the list of beam failure detection reference signals may indicate the TRP associated with each beam failure detection reference signals. For example, the beam failure detection configuration may include at least one list of beam failure detection reference signals for each TRP per BWP of serving cell. For example, the beam failure detection configuration may be configured for each TRP of the serving cell.

In some embodiments, the UE may detect, by physical (PHY) layer, beam failure for a transmission reception point (TRP) of a serving cell based on the beam failure detection configuration;

At step S1910, the UE may trigger, by medium access control (MAC) layer, a beam failure recovery for at least one serving cell.

At step S1920, the UE may identify, by MAC layer, whether evaluation of candidate beams is completed for the at least one serving cell for which the failure recovery is triggered and not cancelled.

At step S1930, the UE may generate, by MAC layer, a MAC control element (CE) for beam failure recovery based on an identified result. For example, detection information (i.e., $C_i$ bit) in the MAC CE is set to 1 for the at least one serving cell for which a beam failure is detected and evaluation of candidate beams is completed.

In some embodiments, the MAC CE may include detection information indicating whether the beam failure is detected and whether the evaluation of the candidate beams has been completed.

In some embodiments, the detection information may be 1 bit, and in case that the detection information corresponds to 1, the detection information may indicate that beam failure is detected, and the evaluation of the candidate beams has been completed.

In some embodiments, the UE may receive, from the BS, a RRC message including a beam failure recovery configuration. For example, the beam failure recovery configuration may include a list of candidate beam reference signals, and a TRP indicator in the list of candidate beam reference signals may indicate the TRP associated with each beam failure detection reference signals. For other example, the beam failure recovery configuration may include at least one list of candidate beam reference signals for each TRP per BWP of serving cell.

In some embodiments, the UE may start or restart, by the MAC layer, a beam failure detection timer corresponding to the TRP of serving cell. Also, the UE may update a counter corresponding to the TRP of serving cell.

Figure 20:
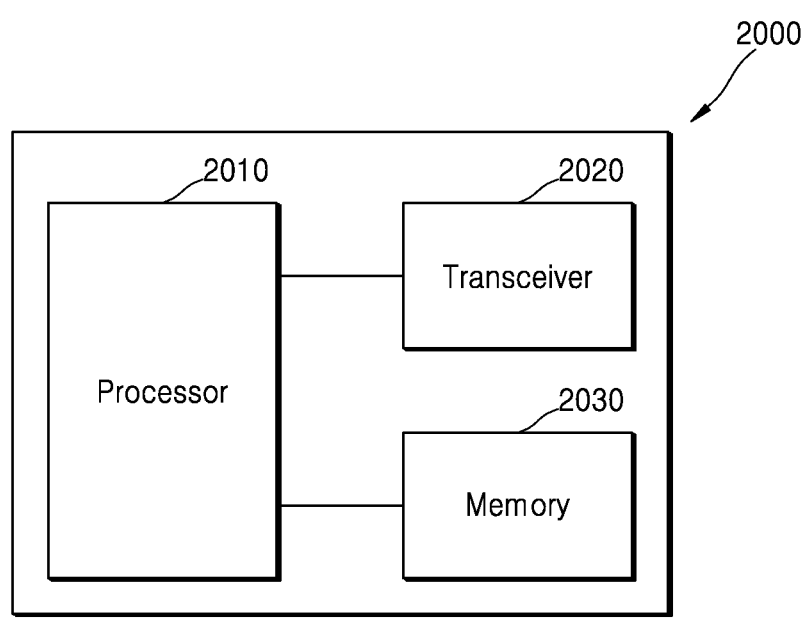
FIG. 20 is a diagram illustrating a UE 2000 according to an embodiment of the present disclosure.

FIG. 20 is a diagram illustrating a UE 2000 according to an embodiment of the present disclosure.

Referring to the FIG. 20, the UE 2000 may include a processor 2010, a transceiver 2020 and a memory 2030. However, all of the illustrated components are not essential. The UE 2000 may be implemented by more or less components than those illustrated in the FIG. 20. In addition, the processor 2010 and the transceiver 2020 and the memory 2030 may be implemented as a single chip according to another embodiment.

The aforementioned components will now be described in detail.

The processor 2010 may include one or more processors or other processing devices that control the provided function, process, and/or method. Operation of the UE 2000 may be implemented by the processor 2010.

The transceiver 2020 may be connected to the processor 2010 and transmit and/or receive a signal. In addition, the transceiver 2020 may receive the signal through a wireless channel and output the signal to the processor 2010. The transceiver 2020 may transmit the signal output from the processor 2010 through the wireless channel.

The memory 2030 may store the control information or the data included in a signal obtained by the UE 2000. The memory 2030 may be connected to the processor 2010 and store at least one instruction or a protocol or a parameter for the provided function, process, and/or method. The memory 2030 may include read-only memory (ROM) and/or random access memory (RAM) and/or hard disk and/or CD-ROM and/or DVD and/or other storage devices.

Figure 21:
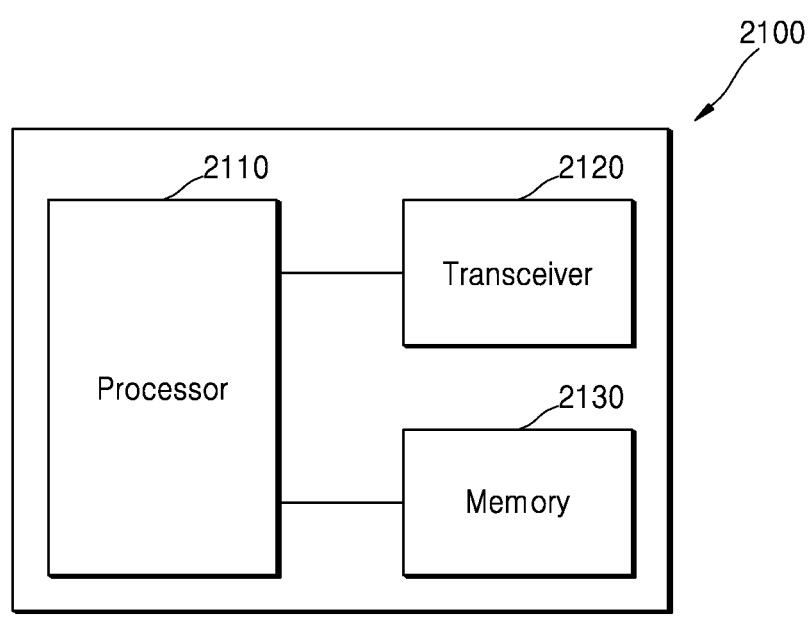
FIG. 21 is a diagram illustrating a base station 2100 according to an embodiment of the present disclosure.

FIG. 21 is a diagram illustrating a base station 2100 according to an embodiment of the present disclosure.

Referring to the FIG. 21, the base station 2100 may include a processor 2110, a transceiver 2120 and a memory 2130. However, all of the illustrated components are not essential. The base station 2100 may be implemented by more or less components than those illustrated in FIG. 21. In addition, the processor 2110 and the transceiver 2120 and the memory 2130 may be implemented as a single chip according to another embodiment.

The aforementioned components will now be described in detail.

The processor 2110 may include one or more processors or other processing devices that control the provided function, process, and/or method. Operation of the base station 2100 may be implemented by the processor 2110.

The transceiver 2120 may be connected to the processor 2110 and transmit and/or receive a signal. The signal may include control information and data. In addition, the transceiver 2120 may receive the signal through a wireless channel and output the signal to the processor 2110. The transceiver 2120 may transmit a signal output from the processor 2110 through the wireless channel.

The memory 2130 may store the control information or the data included in a signal obtained by the base station 2100. The memory 2130 may be connected to the processor 2110 and store at least one instruction or a protocol or a parameter for the provided function, process, and/or method. The memory 2130 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact discROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a wireless communication system, the method comprising:
   triggering, by a medium access control (MAC) layer, a beam failure recovery procedure for at least one serving cell;
   identifying, by the MAC layer, whether an evaluation of candidate beams is completed for the at least one serving cell for which the beam failure recovery procedure is triggered and not cancelled; and
   generating, by the MAC layer, a MAC control element (CE) for the beam failure recovery procedure, based on whether the evaluation of candidate beams is completed for the at least one serving cell,
   wherein the MAC CE includes beam failure detection information corresponding to respective of the at least one serving cell, and
   wherein the beam failure detection information set to 1 indicates that a beam failure is detected for a serving cell of the at least one serving cell and the evaluation of candidate beams is completed for the serving cell.

2. The method of claim 1, wherein the beam failure detection information set to 0 indicates that the beam failure is not detected for the serving cell, or the beam failure is detected for the serving cell and the evaluation of candidate beams is not completed for the serving cell.

3. The method of claim 1, further comprising:
   receiving, from a base station (BS), a radio resource control (RRC) message including beam failure detection configuration information; and
   detecting, by a physical (PHY) layer, the beam failure for a transmission reception point (TRP) of the serving cell based on the beam failure detection configuration information.

4. The method of claim 3, wherein the beam failure detection configuration information includes at least one list of beam failure detection reference signals for each TRP corresponding to a bandwidth part (BWP) of the serving cell.

5. The method of claim 3, wherein the beam failure detection configuration information is configured for each TRP of the serving cell.

6. The method of claim 1, further comprising:
receiving, from a base station (BS), an RRC message including beam failure recovery configuration information.

7. The method of claim 6, wherein the beam failure recovery configuration information includes at least one list of candidate beam reference signals for each TRP corresponding to a BWP of the serving cell.

8. The method of claim 1, further comprising:
starting or restarting, by the MAC layer, a beam failure detection timer corresponding to a TRP of the serving cell; and
updating a counter corresponding to the TRP of the serving cell.

9. The method of claim 1, wherein the MAC CE is a beam failure recovery (BFR) MAC CE in case that uplink shared channel (UL-SCH) resources are available for a new transmission and the UL-SCH resources are available to accommodate the BFR MAC CE plus a subheader of the BFR MAC CE as a result of logical channel prioritization (LCP), and
wherein the MAC CE is a truncated BFR MAC CE in case that the UL-SCH resources are available for a new transmission and the UL-SCH resources are available to accommodate the truncated BFR MAC CE plus a subheader of the truncated BFR MAC CE as a result of LCP.

10. A user equipment (UE) in a wireless communication system, the UE comprising:
a transceiver; and
at least one processor coupled with the transceiver and configured to:
trigger, by a medium access control (MAC) layer, a beam failure recovery procedure for at least one serving cell,
identify, by the MAC layer, whether an evaluation of candidate beams is completed for the at least one serving cell for which the beam failure recovery procedure is triggered and not cancelled, and
generate, by the MAC layer, a MAC control element (CE) for the beam failure recovery procedure, based on whether the evaluation of candidate beams is completed for the at least one serving cell,
wherein the MAC CE includes beam failure detection information corresponding to respective of the at least one serving cell, and
wherein the beam failure detection information is set to 1 indicates that a beam failure is detected for a serving cell of the at least one serving cell and the evaluation of candidate beams is completed for the serving cell.

11. The UE of claim 10, wherein the beam failure detection information set to 0 indicates that the beam failure is not detected for the serving cell, or the beam failure is detected for the serving cell and the evaluation of candidate beams is not completed for the serving cell.

12. The UE of claim 10, wherein the at least one processor is further configured to:
receive, from a base station (BS), a radio resource control (RRC) message including beam failure detection configuration information, and
detect, by a physical (PHY) layer, the beam failure for a transmission reception point (TRP) of the serving cell based on the beam failure detection configuration information.

13. The UE of claim 12, wherein the beam failure detection configuration information includes at least one list of beam failure detection reference signals for each TRP corresponding to a bandwidth part (BWP) of the serving cell.

14. The UE of claim 12, wherein the beam failure detection configuration information is configured for each TRP of the serving cell.

15. The UE of claim 10, wherein the at least one processor is further configured to:
receive, from a base station (BSI an RRC message including beam failure recovery configuration information.

16. The UE of claim 15, wherein the beam failure recovery configuration information includes at least one list of candidate beam reference signals for each TRP corresponding to a BWP of the serving cell.

17. The UE of claim 10, wherein the at least one processor is further configured to:
start or restart, by the MAC layer, a beam failure detection timer corresponding to a TRP of the serving cell, and
update a counter corresponding to the TRP of the serving cell.

18. The UE of claim 10, wherein the MAC CE is a beam failure recovery (BFR) MAC CE in case that uplink shared channel (UL-SCH) resources are available for a new transmission and the UL-SCH resources are available to accommodate the BFR MAC CE plus a subheader of the BFR MAC CE as a result of logical channel prioritization (LCP), and
wherein the MAC CE is a truncated BFR MAC CE in case that the UL-SCH resources are available for a new transmission and the UL-SCH resources are available to accommodate the truncated BFR MAC CE plus a subheader of the truncated BFR MAC CE as a result of LCP.

* * * * *